United States Patent
Lu

(10) Patent No.: US 10,228,540 B2
(45) Date of Patent: Mar. 12, 2019

(54) CAMERA LENS ASSEMBLY AND PORTABLE ELECTRONIC DEVICE

(71) Applicant: ZHEJIANG SUNNY OPTICS CO., LTD., Ningbo, Zhejiang (CN)

(72) Inventor: Jianlong Lu, Zhejiang (CN)

(73) Assignee: ZHEJIANG SUNNY OPTICS CO., LTD., Ningbo, Zhejiang (CN)

(*) Notice: Subject to any disclaimer, the term of this patent is extended or adjusted under 35 U.S.C. 154(b) by 0 days.

(21) Appl. No.: 15/649,225

(22) Filed: Jul. 13, 2017

(65) Prior Publication Data

US 2017/0307855 A1   Oct. 26, 2017

Related U.S. Application Data

(63) Continuation of application No. PCT/CN2016/086611, filed on Jun. 21, 2016.

(30) Foreign Application Priority Data

Apr. 1, 2016 (CN) .......................... 2016 1 0206643

(51) Int. Cl.
G02B 9/62 (2006.01)
G02B 13/00 (2006.01)
G02B 27/01 (2006.01)

(52) U.S. Cl.
CPC ........... G02B 13/0045 (2013.01); G02B 9/62 (2013.01); G02B 2027/0138 (2013.01)

(58) Field of Classification Search
CPC ....... G02B 9/62; G02B 13/04; G02B 13/0045
USPC .......................... 359/713, 752, 756, 757, 759
See application file for complete search history.

(56) References Cited

U.S. PATENT DOCUMENTS

| 9,164,258 B1 | 10/2015 | Chen et al. |
| 9,316,811 B2 | 4/2016 | Chen |
| 2015/0268447 A1 | 9/2015 | Huang |
| 2015/0338614 A1 | 11/2015 | Tang et al. |

(Continued)

FOREIGN PATENT DOCUMENTS

| CN | 104330880 A | 2/2015 |
| CN | 104656228 A | 5/2015 |
| CN | 104932084 A | 9/2015 |

(Continued)

OTHER PUBLICATIONS

International Search Report and Written Opinion dated Jan. 1, 2017 for corresponding International Application No. PCT/CN2016/086611, filed Jun. 21, 2016.

*Primary Examiner* — William Choi
(74) *Attorney, Agent, or Firm* — David D. Brush; Westman, Champlin & Koehler, P.A.

(57) ABSTRACT

Provided are a camera lens assembly and a portable electronic device. The camera lens assembly includes first, second, third, fourth, fifth and sixth lenses from an object side to an image side. The first lens has a positive focal power and a convex object side surface. The second lens has a focal power and a symmetrically-transitional image side surface from concave to convex along a direction vertical to an optical axis, in which the image side surface is concave close to the optical axis and convex away from the optical axis. The third lens has a focal power and a convex object side surface. The fourth lens has a positive focal power and a convex image side surface. The fifth lens is of a focal power. The sixth lens has a negative focal power, a convex object side surface and a concave image side surface.

11 Claims, 15 Drawing Sheets

(56) References Cited

U.S. PATENT DOCUMENTS

2016/0077311 A1  3/2016  Tang et al.

FOREIGN PATENT DOCUMENTS

| CN | 105093498 A | 11/2015 |
| CN | 105204138 A | 12/2015 |
| CN | 105425361 A | 3/2016 |

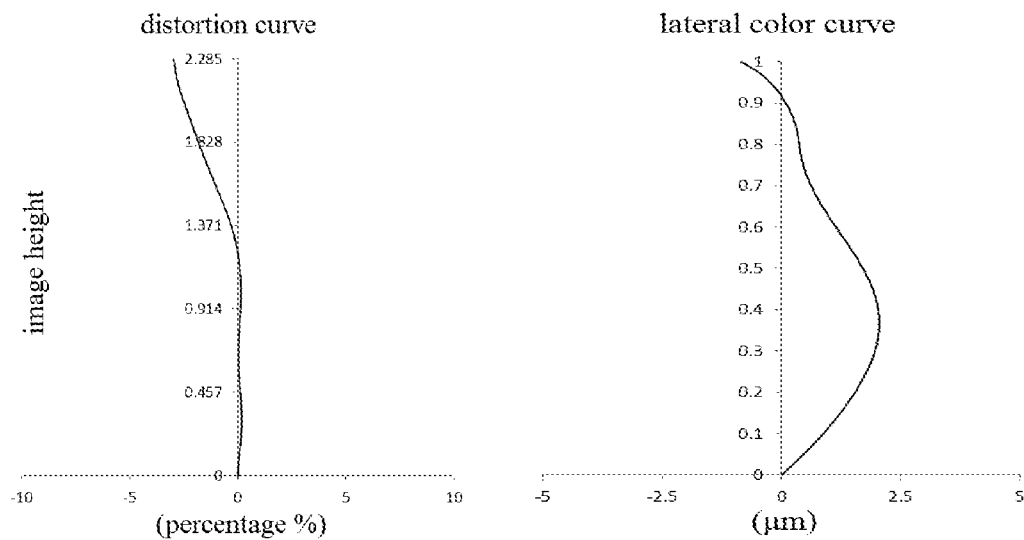
Fig. 4
Fig. 5
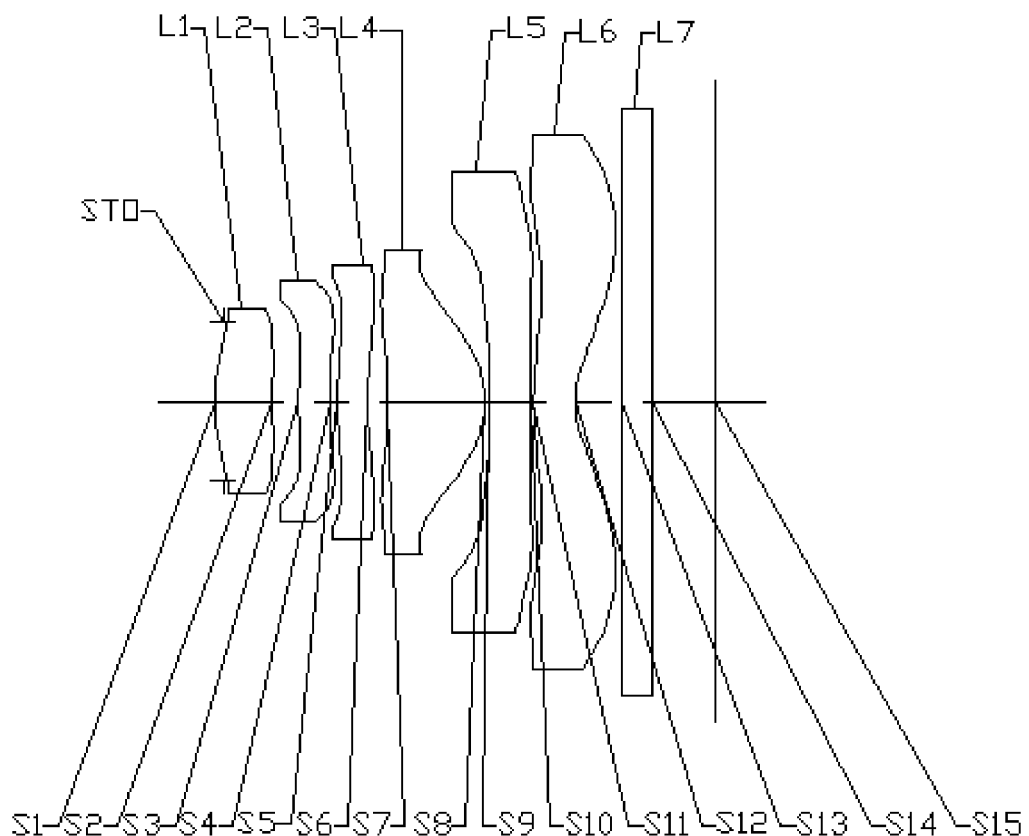
Fig. 6

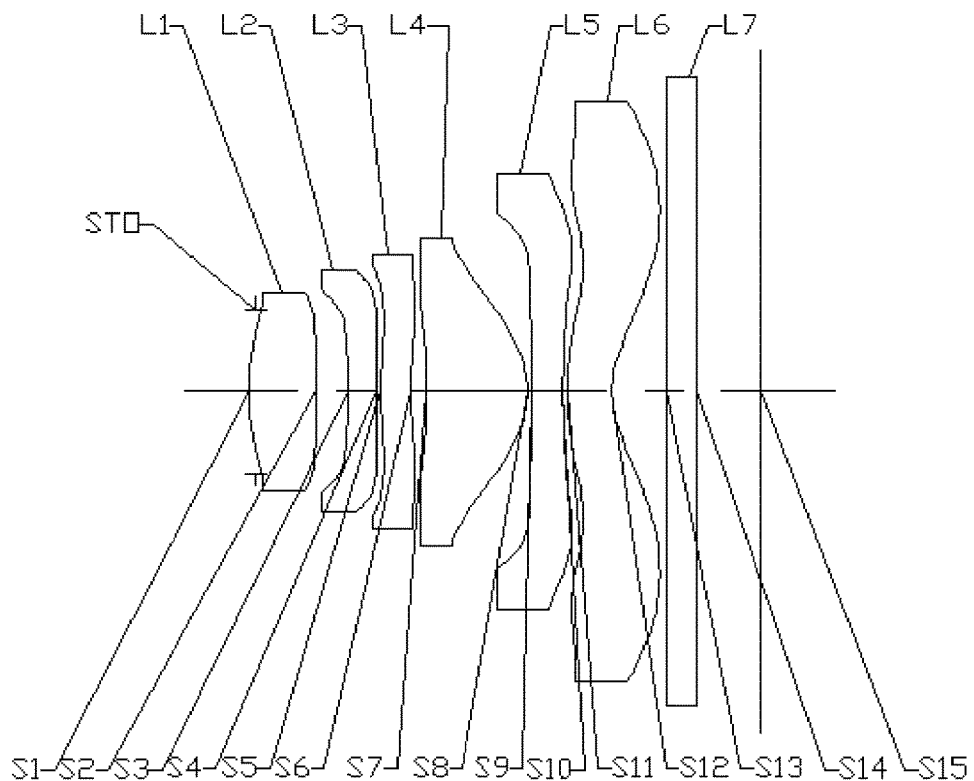
Fig. 21
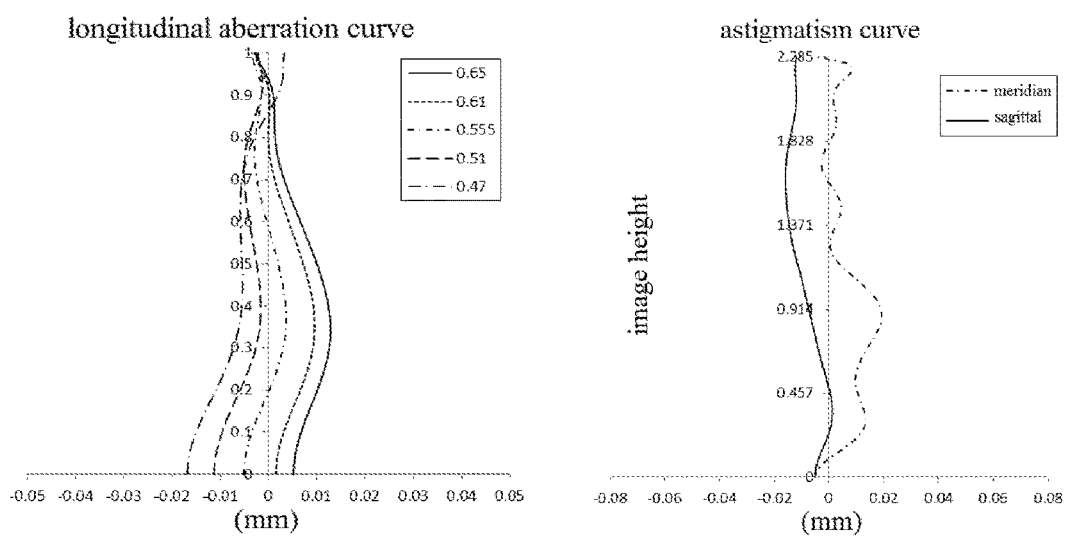
Fig. 22
Fig. 23

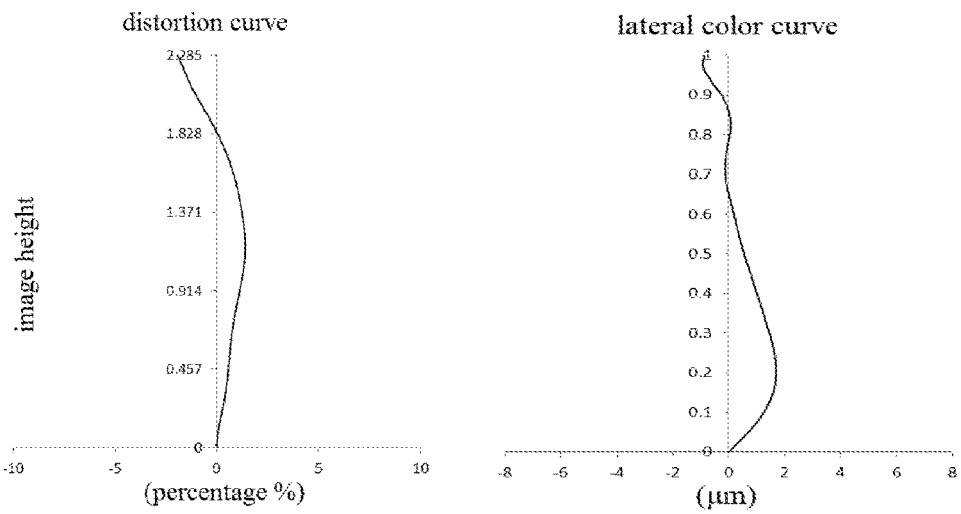
Fig. 24
Fig. 25
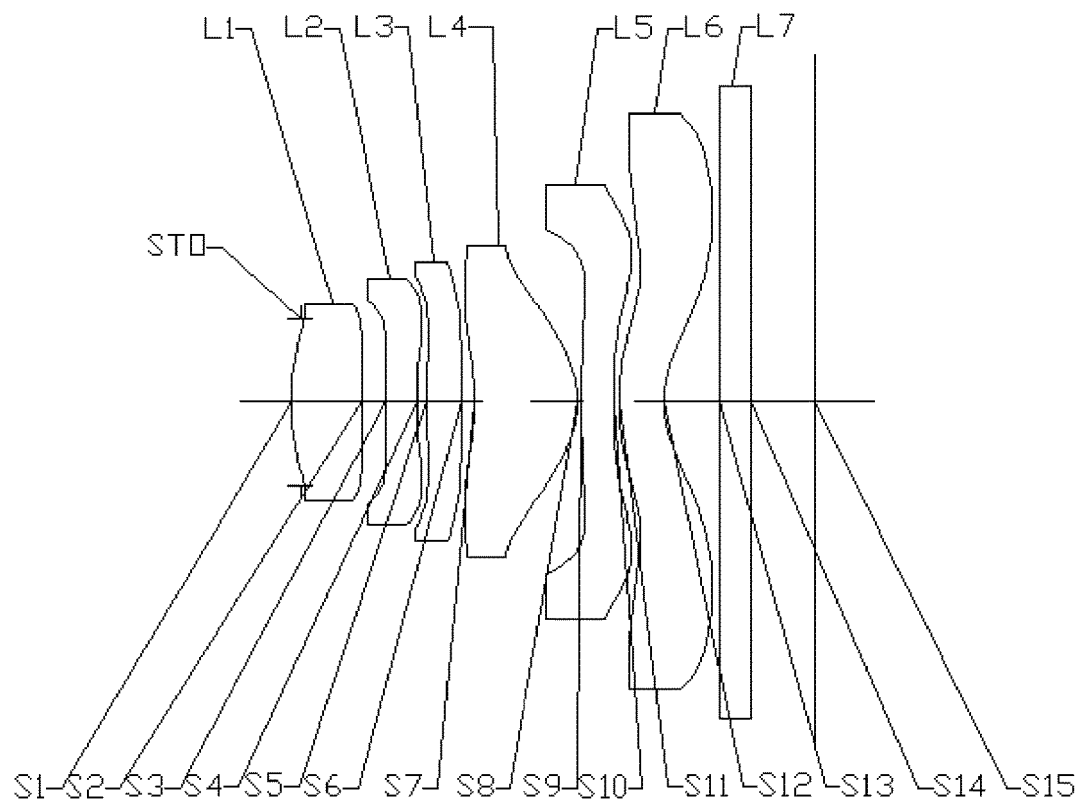
Fig. 26

CAMERA LENS ASSEMBLY AND PORTABLE ELECTRONIC DEVICE

CROSS-REFERENCE TO RELATED APPLICATIONS

The application is a continuation application of PCT Application No. PCT/CN2016/086611 filed on Jun. 21, 2016, which claims a priority to and benefits of Chinese Patent Application No. 201610206643.0, filed with the State Intellectual Property Office of P. R. China on Apr. 1, 2016, the entire contents of which are incorporated herein by reference.

FIELD

The present disclosure relates to an imaging technology, in particularly to a camera lens assembly and a portable electronic device.

BACKGROUND

Currently, a photosensitive component of an imaging system includes a charge-coupled device (CCD) or a complementary metal-oxide semiconductor (CMOS). With the development of the technology of semiconductor manufacturing process, the photosensitive component is of a reduced-size of pixel and the imaging system is of an improved pixel, in particularly when a camera lens assembly is applied to a portable electronic device such as a wearable devices. Accordingly, the camera lens assembly of the optical system is required to have a high resolution and a small size as well. Currently, a camera lens assembly generally includes five lenses, which does not meet the requirement of the high resolution. Regarding this problem, the lens number of the camera lens assembly may be increased to improve the resolution; however, this may have negative effect on miniaturization and light weight of the camera lens assembly.

SUMMARY

Embodiments of the present disclosure seek to solve at least one of the problems existing in the related art. Accordingly, a camera lens assembly and a portable electronic device are provided embodiments of in the present disclosure.

In an embodiment of the present disclosure, a camera lens assembly includes a first lens, a second lens, a third lens, a fourth lens, a fifth lens and a sixth lens from an object side of the camera lens assembly to an image side of the camera lens assembly in turn, wherein the first lens is of a positive refractive power, an object side surface of the first lens is convex;

the second lens is of a focal power, an image side surface of the second lens is a symmetrically-transitional surface from concave to convex along a direction vertical to an optical axis, wherein the image side surface of the second lens is concave close to the optical axis and convex away from the optical axis;

the third lens is of a focal power, an object side surface of the third lens is convex;

the fourth lens is of a positive focal power, an image side surface of the fourth lens is convex;

the fifth lens is of a focal power, and the sixth lens is of a negative focal power, an object side surface of the sixth lens is convex and an image side surface of the sixth lens is concave;

the camera lens assembly meets the following formula:

$$f4/CT4<2.5,$$

wherein f4 represents an effective focal length of the fourth lens, and

CT4 is a thickness of the fourth lens along the optical axis.

In some embodiments of the present disclosure, the camera lens assembly meets the following formula:

$$0.15<CT4/TTL<0.3,$$

wherein CT4 is a thickness of the fourth lens along the optical axis, and

TTL is a total length of the camera lens assembly.

In some embodiments of the present disclosure, the camera lens assembly meets the following formula:

$$TAN(HFOV)/TTL \geq 0.28 \text{ mm}^{-1},$$

wherein HFOV is half of a maximal field angle of the camera lens assembly, and

TTL is a total length of the camera lens assembly.

In some embodiments of the present disclosure, the camera lens assembly meets the following formula:

$$-1<f4/f6<-0.2,$$

wherein f4 represents an effective focal length of the fourth lens, and f6 represents an effective focal length of the sixth lens.

In some embodiments of the present disclosure, the camera lens assembly meets the following formula:

$$CT3/CT4<0.6,$$

wherein CT3 is a thickness of the third lens along the optical axis, and

CT4 is a thickness of the fourth lens along the optical axis.

In some embodiments of the present disclosure, the camera lens assembly meets the following formula:

$$0.35<f/f1<0.9,$$

wherein f represents an effective focal length of the camera lens assembly, and f1 represents an effective focal length of the first lens.

In some embodiments of the present disclosure, the camera lens assembly meets the following formula:

$$0.45<R1/R5<1.10,$$

wherein R1 represents a curvature radius of the object side surface of the first lens, and R5 represents a curvature radius of the object side surface of the third lens.

In some embodiments of the present disclosure, the camera lens assembly meets the following formula:

$$TTL/ImgH<1.6,$$

wherein TTL is a total length of the camera lens assembly, and

ImgH equals to half of a diagonal of an effective pixel region at an imaging side surface of the camera lens assembly.

In some embodiments of the present disclosure, the camera lens assembly meets the following formula:

$$(T12+T23)/TTL<0.1,$$

wherein T12 is a spacing distance between the first lens and the second lens along the optical axis, T23 is a spacing distance between the second lens and the third lens along the optical axis, and TTL is a total length of the camera lens assembly.

The camera lens assembly provided in embodiments of the present disclosure has advantages of a small size and a high imaging quality.

In an embodiment of the present disclosure, a portable electronic device is provided, including:

an imaging device, including:
said camera lens assembly configured to form an optical image of an object in front of the portable electronic device; and
an image sensor configured to convert the optical image formed by the camera lens assembly into an electronic image, a projecting device, configured to project the electronic image on human eye to form a virtual image or a superposition image, and a controlling device, configured to control the imaging device and the projecting device to realize recognition and intelligent operation of the portable electronic device.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 4 is a diagram showing a distortion curve (%) of the camera lens assembly in Example 1;

FIG. 5 is a diagram showing a lateral color curve (μm) of the camera lens assembly in Example 1;

FIG. 6 is a schematic view showing the camera lens assembly according to Example 2 of the present disclosure;

FIG. 21 is a schematic view showing the camera lens assembly according to Example 5 of the present disclosure;

FIG. 22 is a diagram showing a longitudinal aberration curve (mm) of the camera lens assembly in Example 5;

FIG. 23 is a diagram showing an astigmatism curve (mm) of the camera lens assembly in Example 5;

FIG. 24 is a diagram showing a distortion curve (%) of the camera lens assembly in Example 5;

FIG. 25 is a diagram showing a lateral color curve (μm) of the camera lens assembly in Example 5;

FIG. 26 is a schematic view showing the camera lens assembly according to Example 6 of the present disclosure;

DETAILED DESCRIPTION

Figure 1:
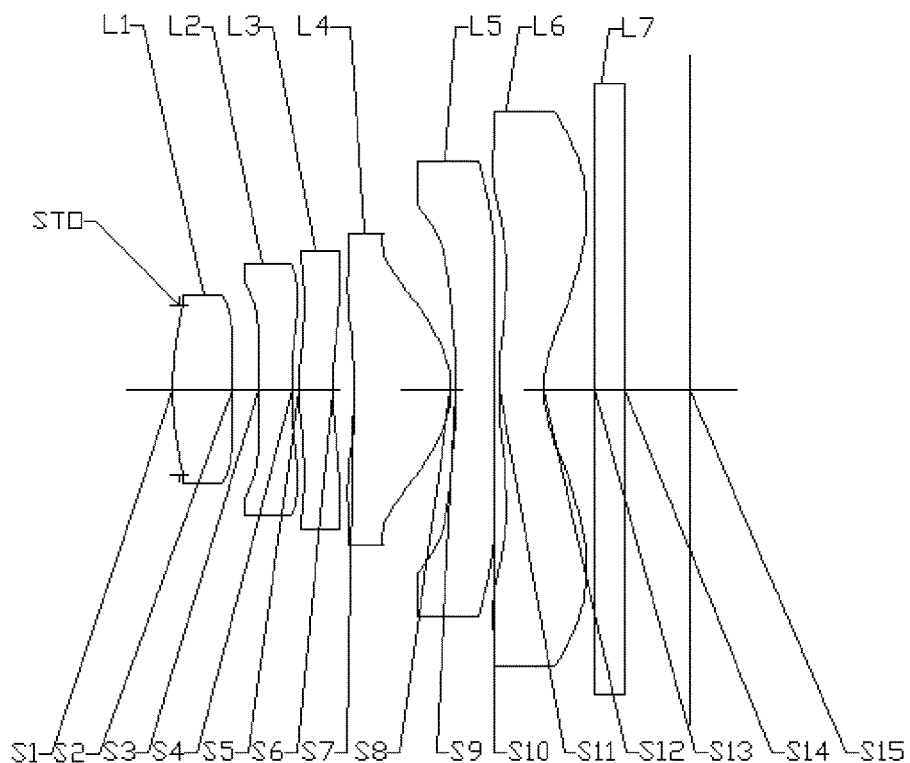
FIG. 1 is a schematic view showing the camera lens assembly according to Example 1 of the present disclosure.
Figures 2, 3:
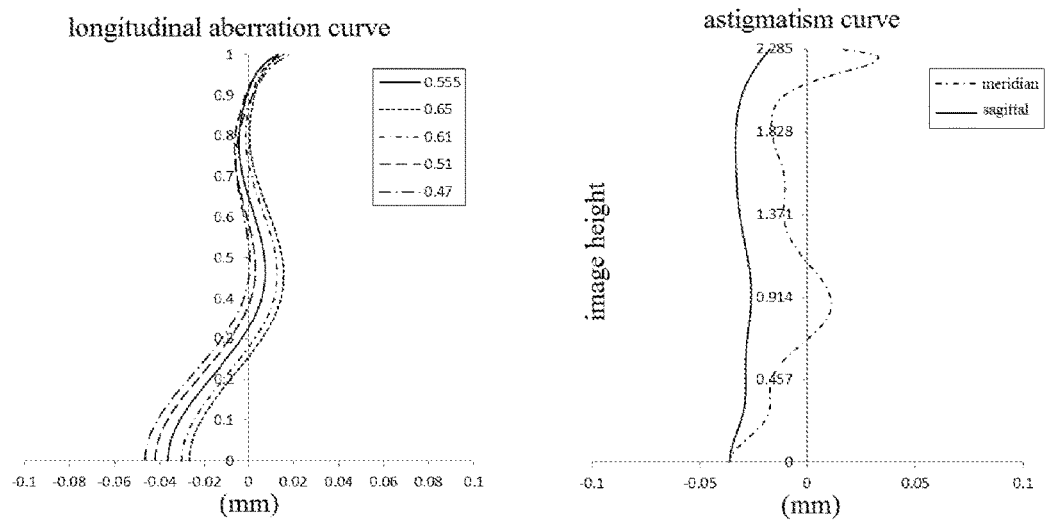
FIG. 2 is a diagram showing a longitudinal aberration curve (mm) of the camera lens assembly in Example 1.
FIG. 3 is a diagram showing an astigmatism curve (mm) of the camera lens assembly in Example 1.
Figure 7:
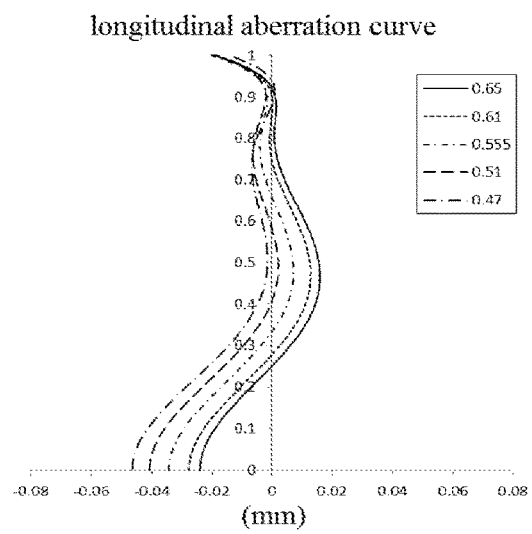
FIG. 7 is a diagram showing a longitudinal aberration curve (mm) of the camera lens assembly in Example 2.
Figure 8:
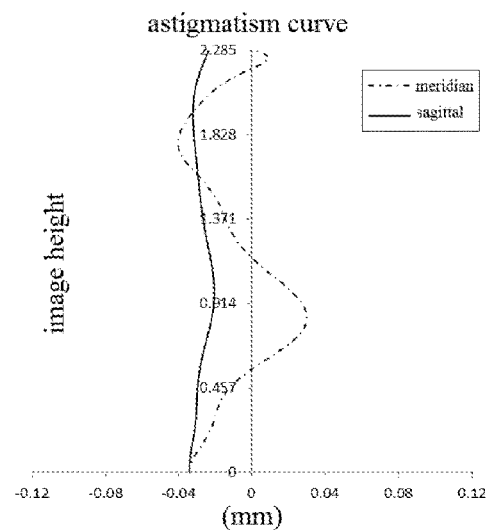
FIG. 8 is a diagram showing an astigmatism curve (mm) of the camera lens assembly in Example 2.
Figure 9:
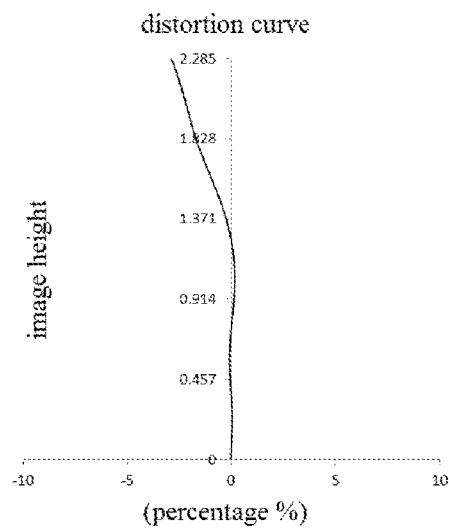
FIG. 9 is a diagram showing a distortion curve (%) of the camera lens assembly in Example 2.
Figure 10:
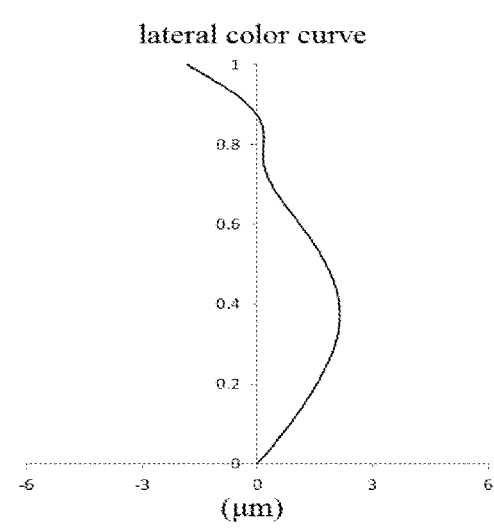
FIG. 10 is a diagram showing a lateral color curve (μm) of the camera lens assembly in Example 2.
Figure 11:
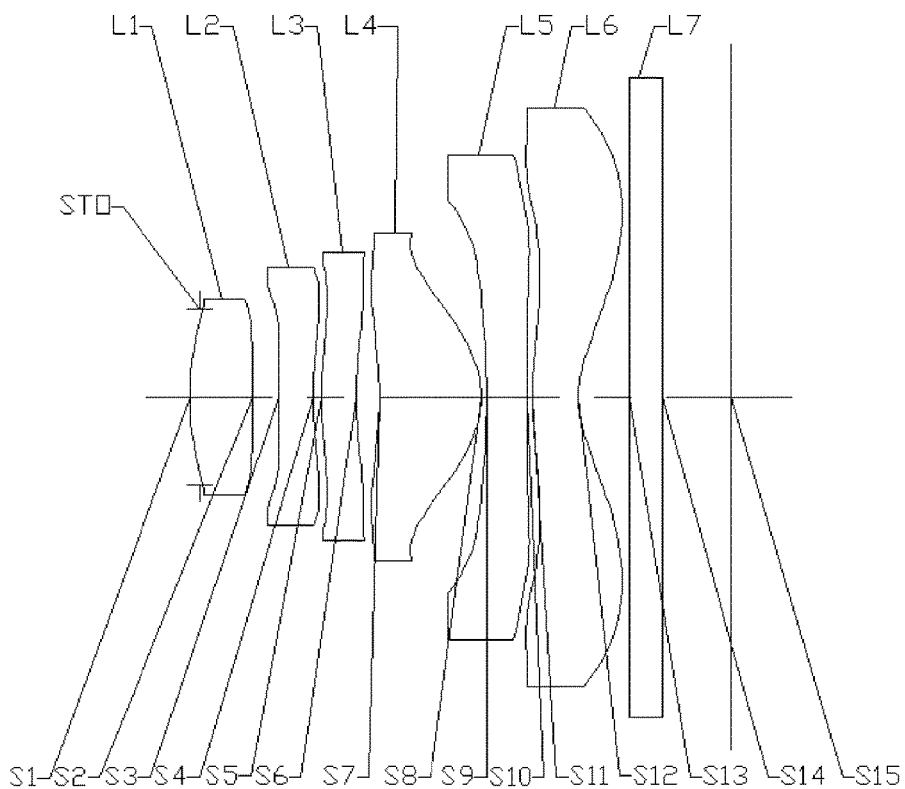
FIG. 11 is a schematic view showing the camera lens assembly according to Example 3 of the present disclosure.
Figures 12, 13:
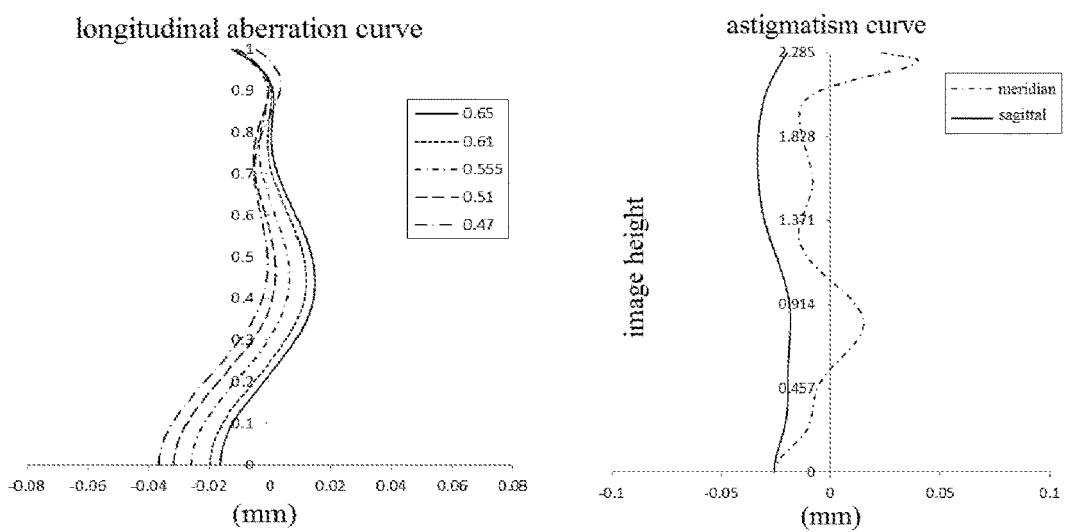
FIG. 12 is a diagram showing a longitudinal aberration curve (mm) of the camera lens assembly in Example 3.
FIG. 13 is a diagram showing an astigmatism curve (mm) of the camera lens assembly in Example 3.
Figures 14, 15:
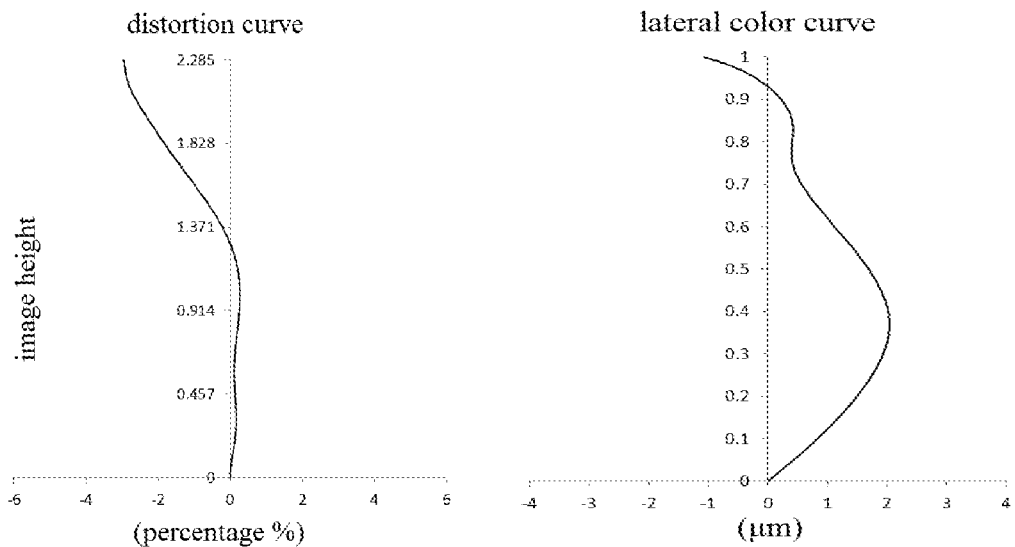
FIG. 14 is a diagram showing a distortion curve (%) of the camera lens assembly in Example 3.
FIG. 15 is a diagram showing a lateral color curve (μm) of the camera lens assembly in Example 3.
Figure 16:
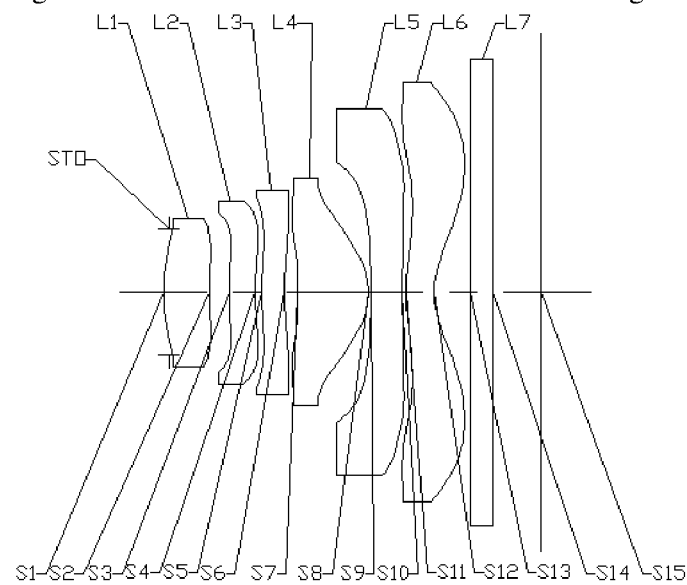
FIG. 16 is a schematic view showing the camera lens assembly according to Example 4 of the present disclosure.
Figure 17:
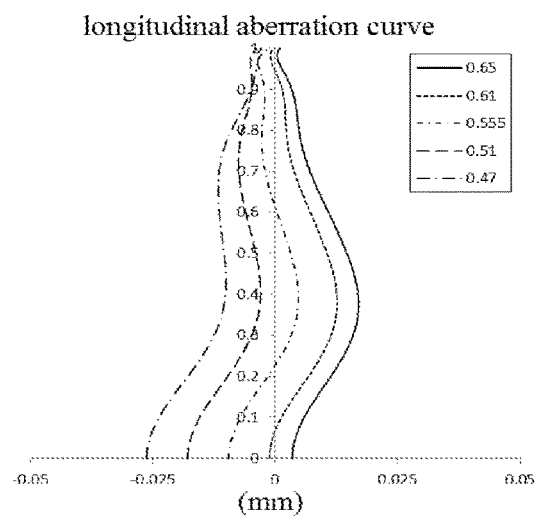
FIG. 17 is a diagram showing a longitudinal aberration curve (mm) of the camera lens assembly in Example 4.
Figure 18:
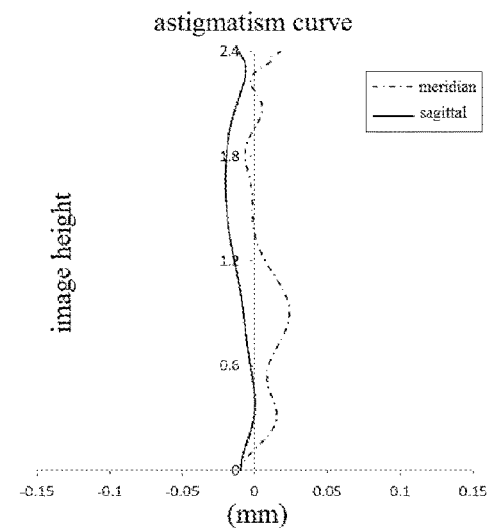
FIG. 18 is a diagram showing an astigmatism curve (mm) of the camera lens assembly in Example 4.
Figure 19:
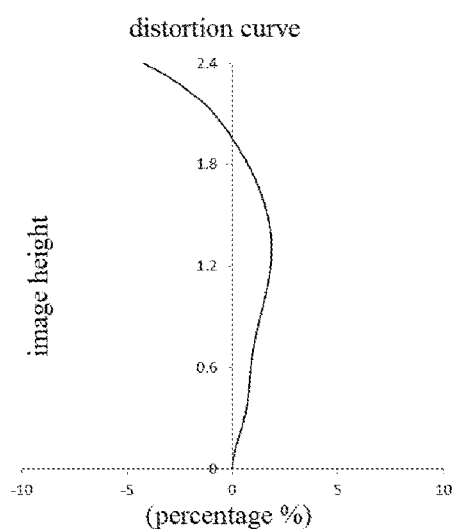
FIG. 19 is a diagram showing a distortion curve (%) of the camera lens assembly in Example 4.
Figure 20:
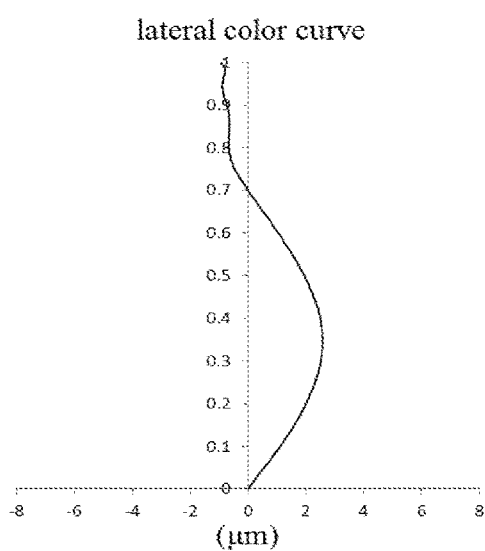
FIG. 20 is a diagram showing a lateral color curve (μm) of the camera lens assembly in Example 4.
Figure 27:
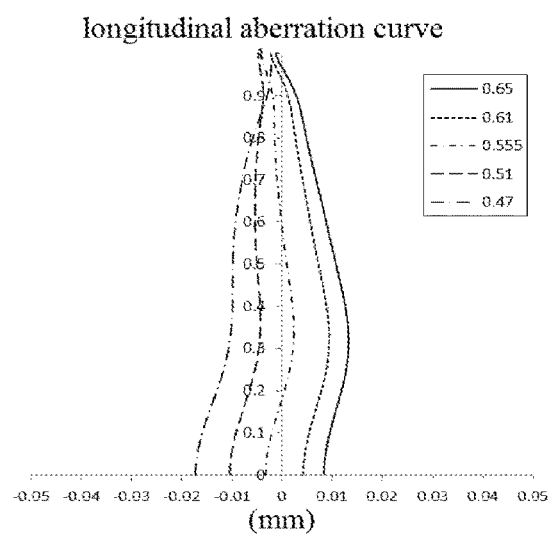
FIG. 27 is a diagram showing a longitudinal aberration curve (mm) of the camera lens assembly in Example 6.
Figure 28:
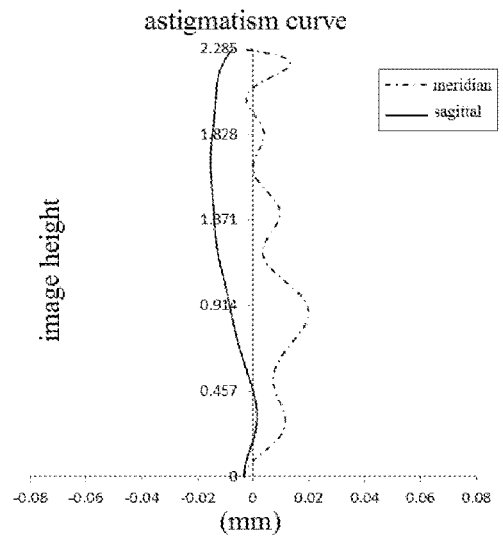
FIG. 28 is a diagram showing an astigmatism curve (mm) of the camera lens assembly in Example 6.
Figure 29:
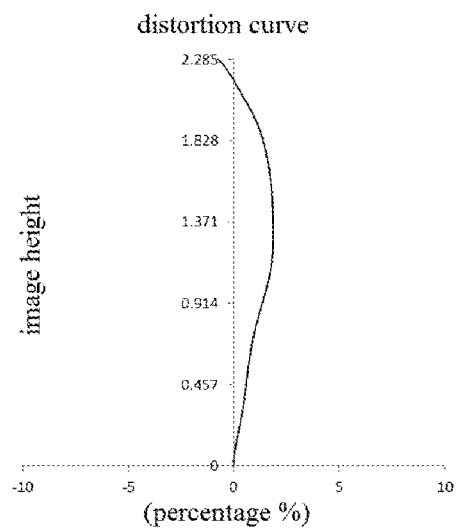
FIG. 29 is a diagram showing a distortion curve (%) of the camera lens assembly in Example 6.
Figure 30:
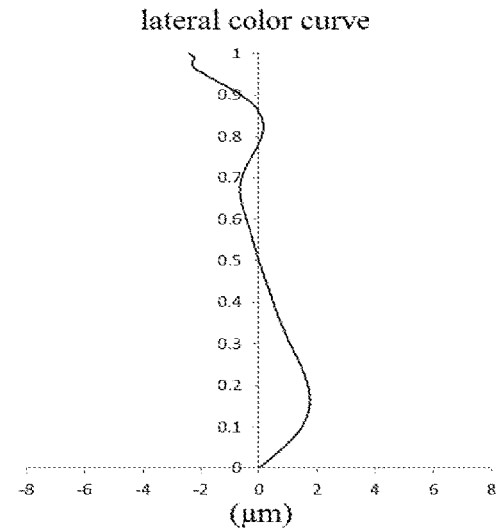
FIG. 30 is a diagram showing a lateral color curve (μm) of the camera lens assembly in Example 6.
Figure 31:
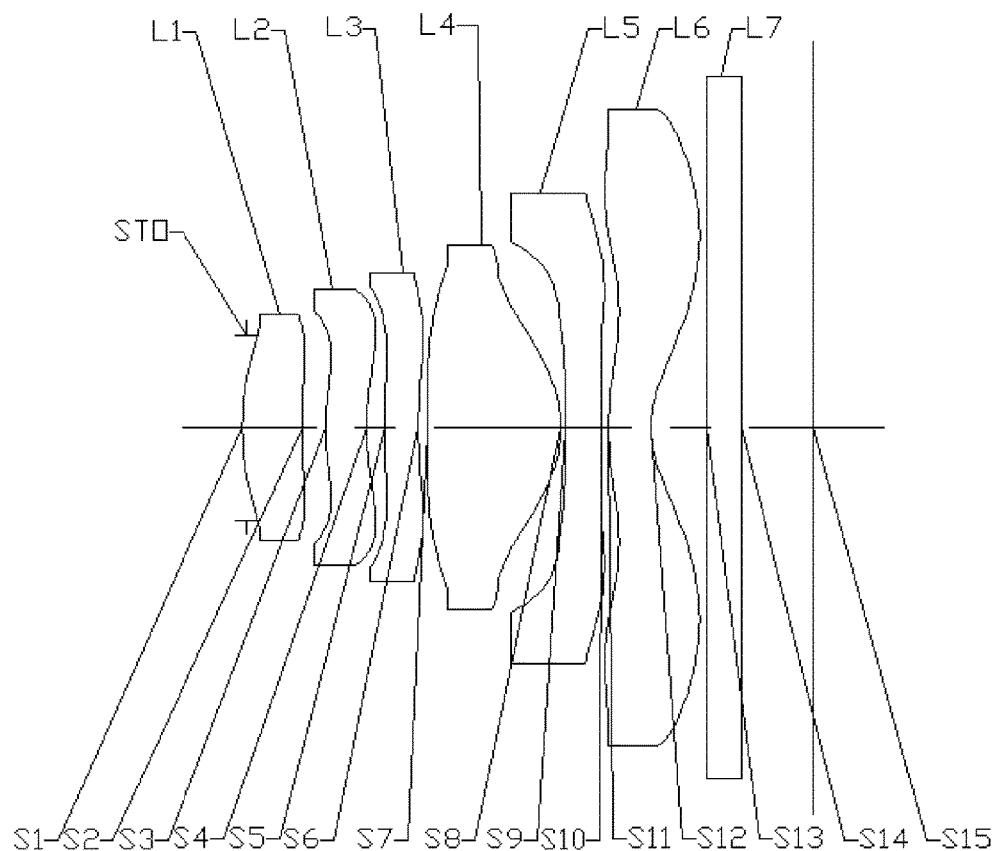
FIG. 31 is a schematic view showing the camera lens assembly according to Example 7 of the present disclosure.
Figure 32:
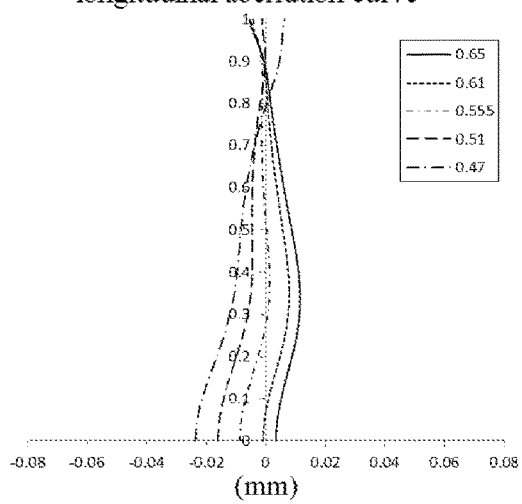
FIG. 32 is a diagram showing a longitudinal aberration curve (mm) of the camera lens assembly in Example 7.
Figure 33:
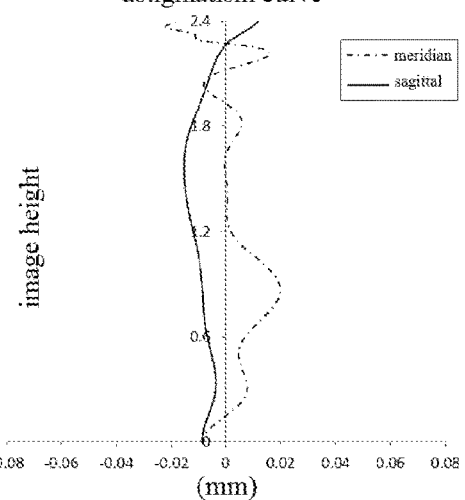
FIG. 33 is a diagram showing an astigmatism curve (mm) of the camera lens assembly in Example 7.
Figures 34, 35:
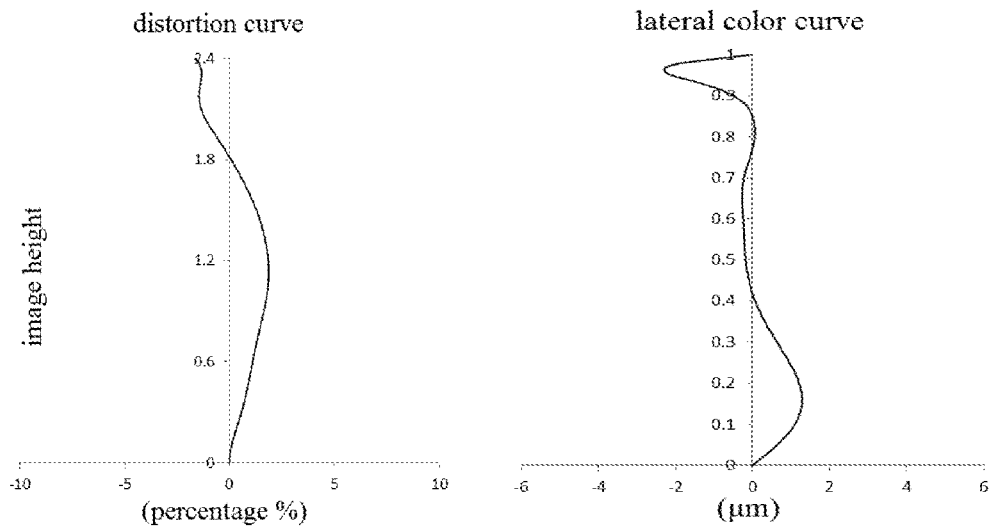
FIG. 34 is a diagram showing a distortion curve (%) of the camera lens assembly in Example 7.
FIG. 35 is a diagram showing a lateral color curve (μm) of the camera lens assembly in Example 7.
Figure 36:
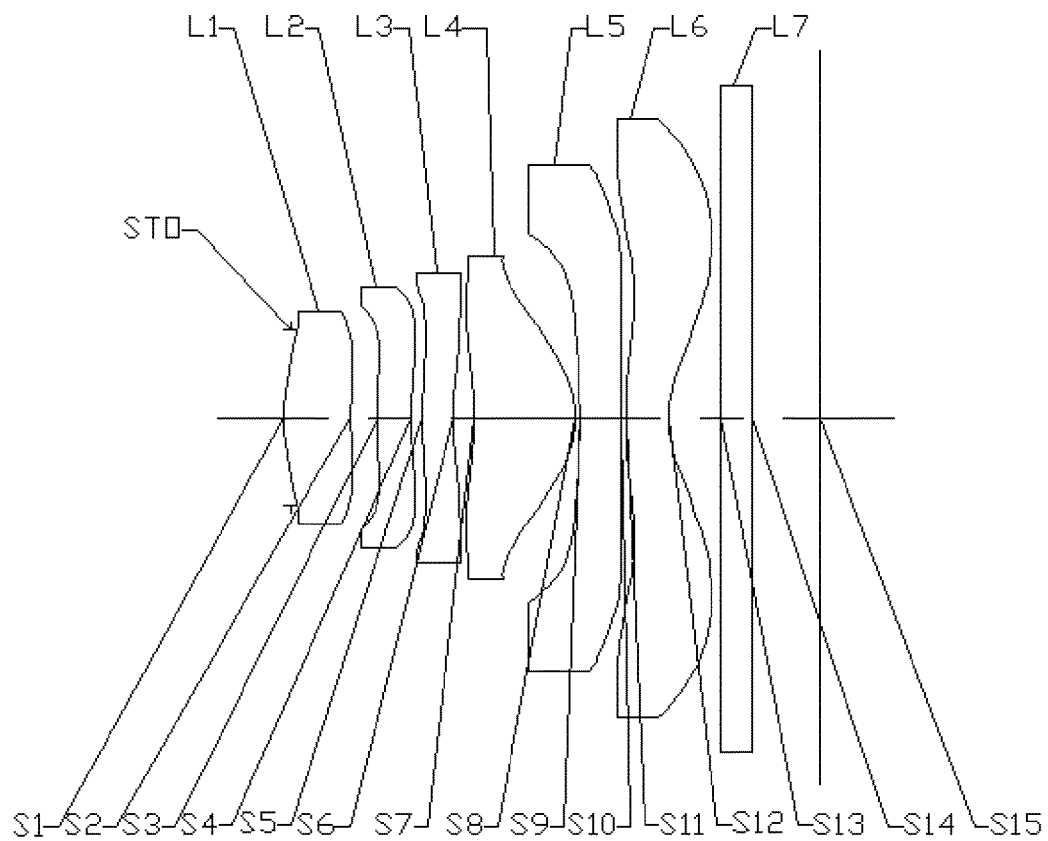
FIG. 36 is a schematic view showing the camera lens assembly according to Example 8 of the present disclosure.
Figure 37:
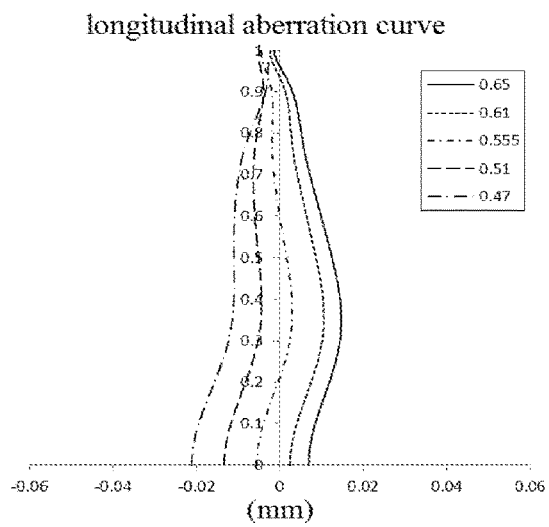
FIG. 37 is a diagram showing a longitudinal aberration curve (mm) of the camera lens assembly in Example 8.
Figure 38:
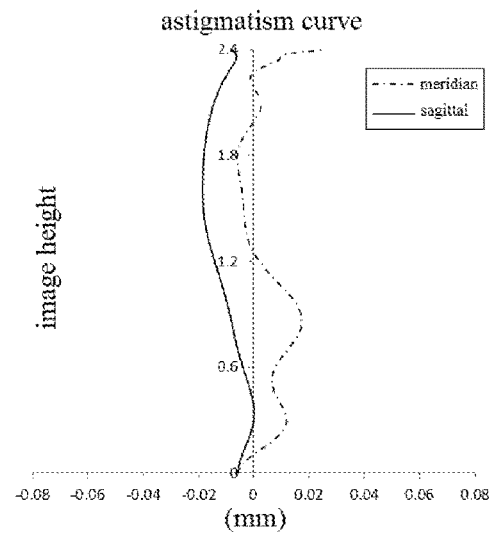
FIG. 38 is a diagram showing an astigmatism curve (mm) of the camera lens assembly in Example 8.
Figure 39:
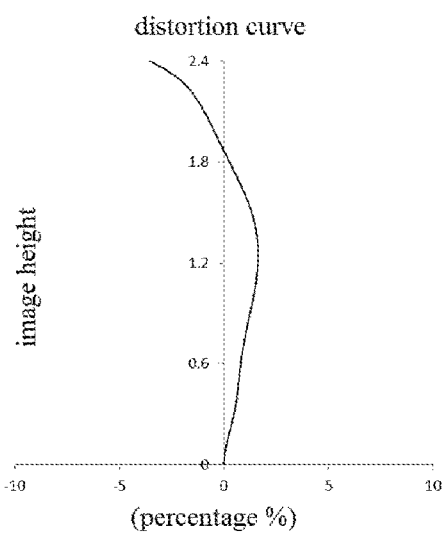
FIG. 39 is a diagram showing a distortion curve (%) of the camera lens assembly in Example 8.
Figure 40:
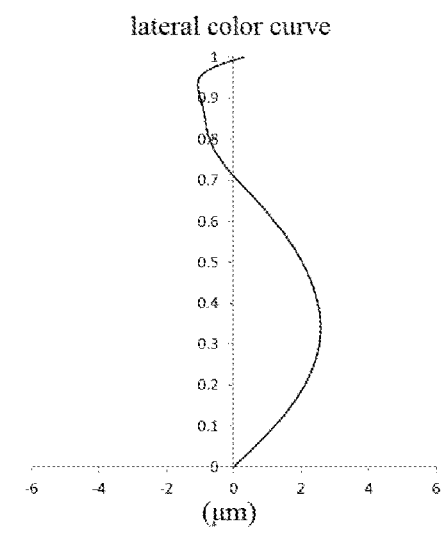
FIG. 40 is a diagram showing a lateral color curve (μm) of the camera lens assembly in Example 8.
Figure 41:
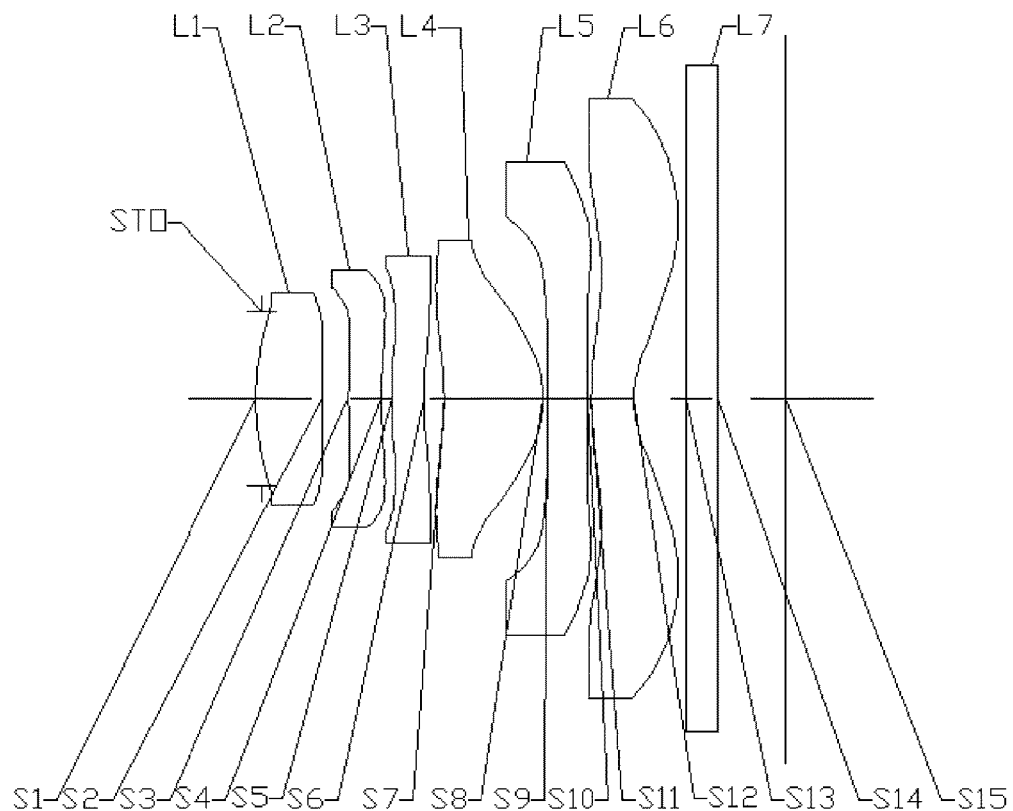
FIG. 41 is a schematic view showing the camera lens assembly according to Example 9 of the present disclosure.
Figure 42:
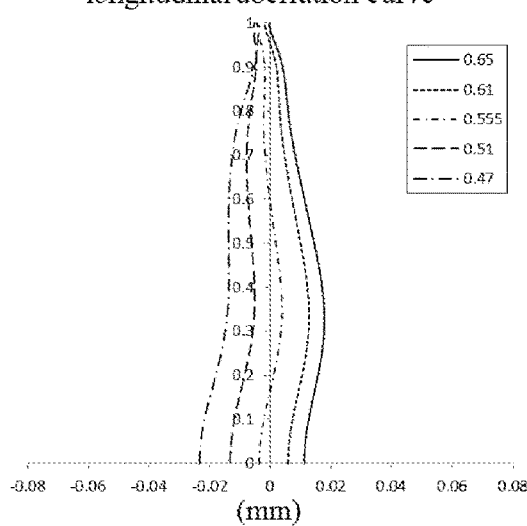
FIG. 42 is a diagram showing a longitudinal aberration curve (mm) of the camera lens assembly in Example 9.
Figure 43:
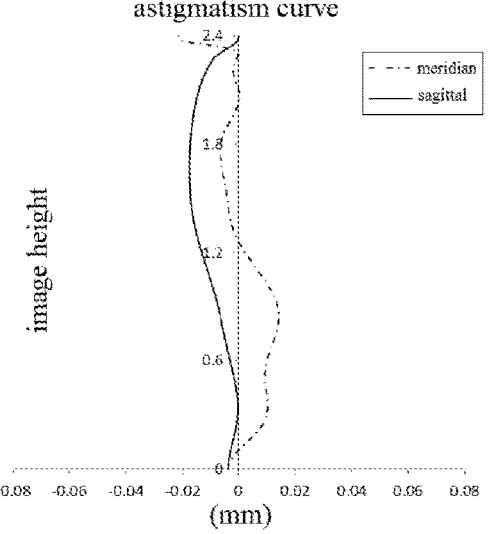
FIG. 43 is a diagram showing an astigmatism curve (mm) of the camera lens assembly in Example 9.
Figures 44, 45:
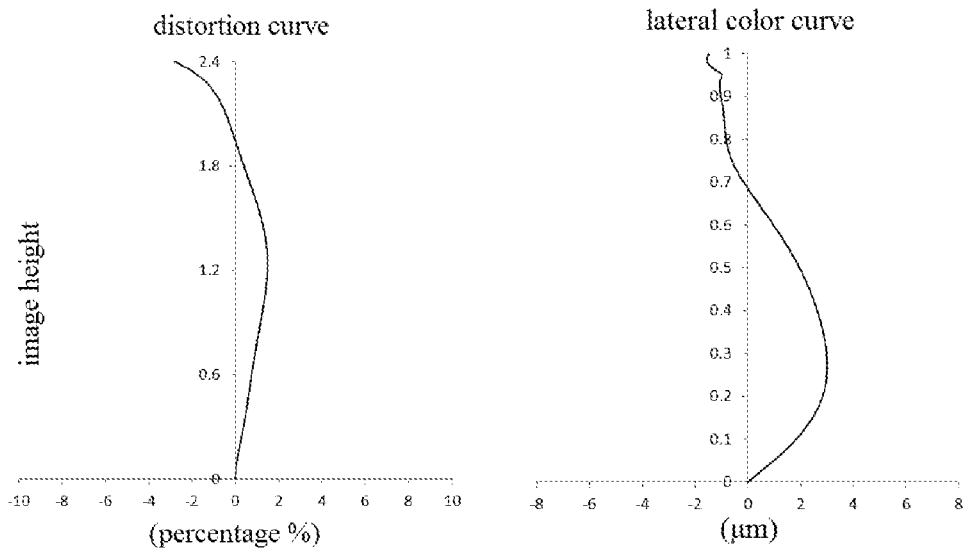
FIG. 44 is a diagram showing a distortion curve (%) of the camera lens assembly in Example 9.
FIG. 45 is a diagram showing a lateral color curve (μm) of the camera lens assembly in Example 9.
Figure 46:
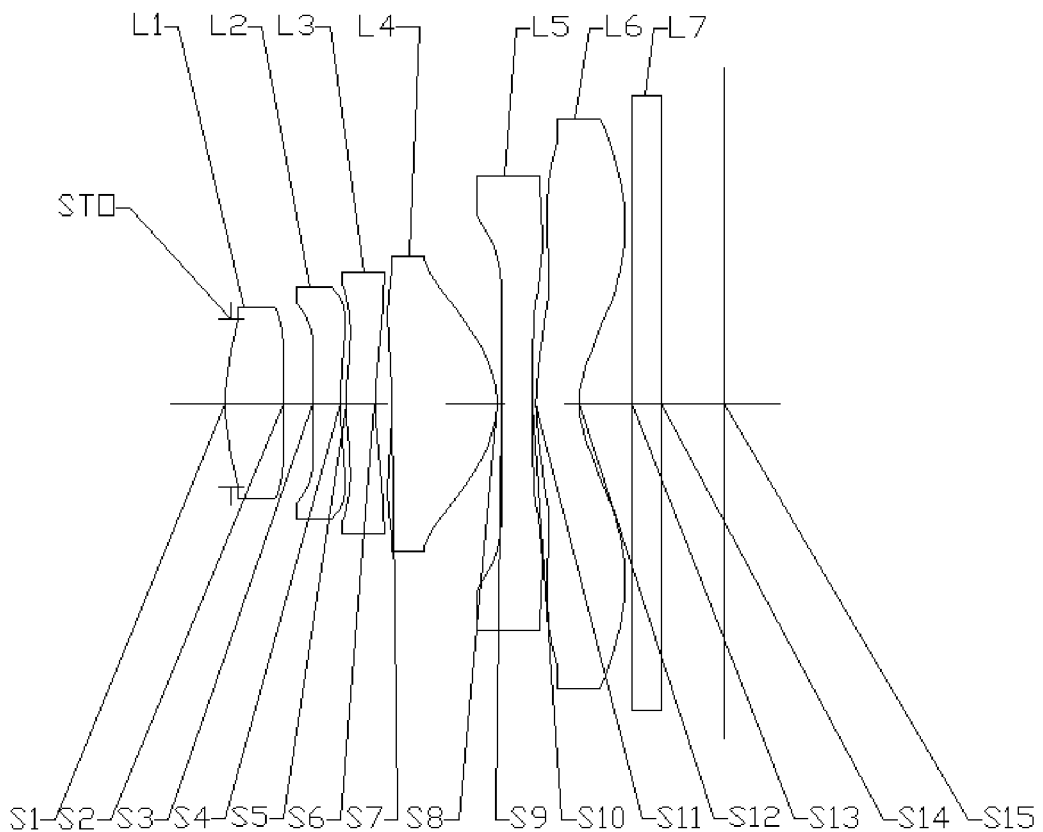
FIG. 46 is a schematic view showing the camera lens assembly according to Example 10 of the present disclosure.
Figures 47, 48:
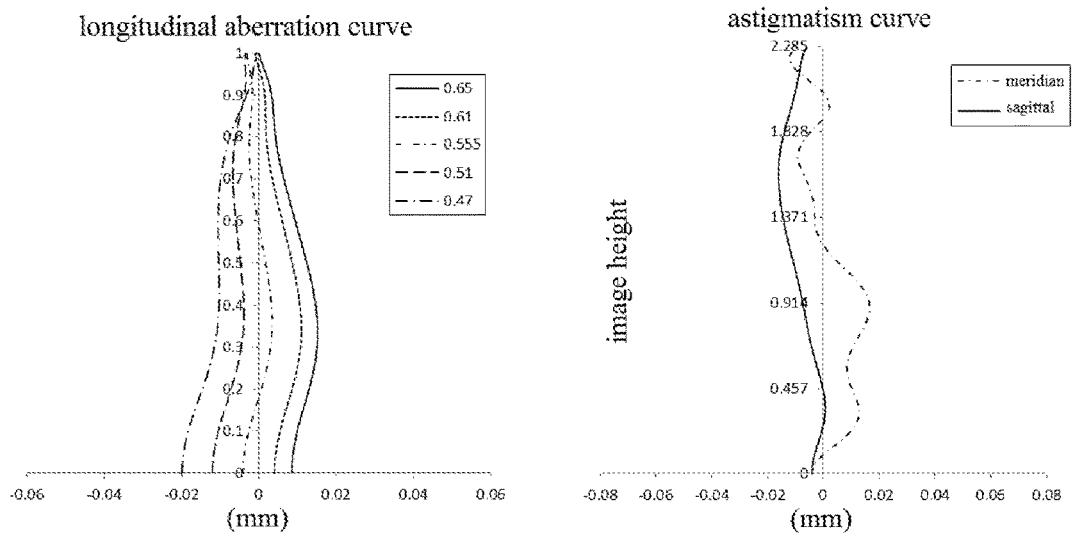
FIG. 47 is a diagram showing a longitudinal aberration curve (mm) of the camera lens assembly in Example 10.
FIG. 48 is a diagram showing an astigmatism curve (mm) of the camera lens assembly in Example 10.
Figures 49, 50:
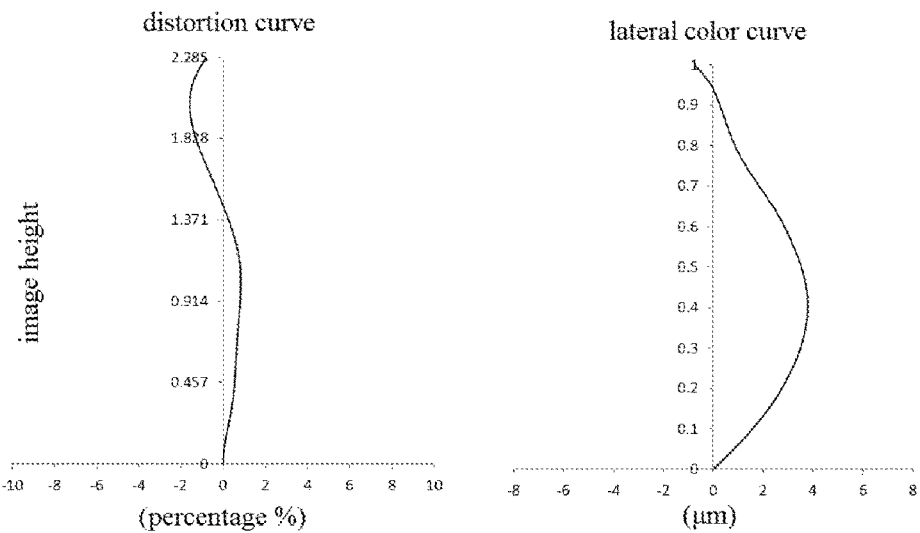
FIG. 49 is a diagram showing a distortion curve (%) of the camera lens assembly in Example 10.
FIG. 50 is a diagram showing a lateral color curve (μm) of the camera lens assembly in Example 10.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, unless specified otherwise, "a plurality of" means two or more than two.

In the description of the present disclosure, it should be noted that, unless otherwise clearly defined and limited, the terms "mounted", "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

Various embodiments and examples are provided in the following descriptions to implement different structures of the present disclosure. In order to simplify the present disclosure, certain elements and settings will be described. However, these elements and settings are only by way of example and are not intended to limit the present disclosure.

In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, there is provided in embodiments a camera lens assembly, including a first lens L1 being of a positive focal power, a second lens L2 being of a focal power, a third lens L3 being of a focal power, a fourth lens L4 being of a positive focal power, a fifth lens L5 being of a focal power and a sixth lens L6 being of a negative focal power.

The first lens L1 has an object side surface S1 and an image side surface S2. The second lens L2 has an object side surface S3 and an image side surface S4. The third lens L3 has an object side surface S5 and an image side surface S6. The fourth lens L4 has an object side surface S7 and an image side surface S8. The fifth lens L5 has an object side surface S9 and an image side surface S10. The sixth lens L6 has an object side surface S11 and an image side surface S12.

During imaging, light passes through the camera lens assembly, and then is imaged at the image side surface S15 after passing through a light filter L7 including an object side surface S13 and an image side surface S14.

In some embodiments, the object side surface S1 is convex. The image side surface S4 is a symmetrically-transitional surface from concave to convex along a direction vertical to an optical axis, in which the image side surface S4 is concave close to the optical axis and convex away from the optical axis. The object side surface S5 is convex. The image side surface S8 is convex. The object side surface S11 is convex and the image side surface S12 is concave. Moreover, the camera lens assembly meets the following formula:

$$f4/CT4<2.5,$$

in which f4 represents an effective focal length of the fourth lens L4, and

CT4 is a thickness of the fourth lens L4 along the optical axis.

The above formula is satisfied to shorten the size of the fourth lens L4 and well calibrate the distortion of the camera lens assembly, thus the camera lens assembly has a smaller size and a higher imaging quality as well.

In some embodiments, the camera lens assembly meets the following formula:

$$0.15<CT4/TTL<0.3,$$

in which TTL is a total length of the camera lens assembly, alternatively, is a distance between the object side surface S1 of the first lens L1 and the image side surface S15 along the optical axis.

The above formula is satisfied to ensure a uniform shape of the fourth lens L4, thus the lens is easy to produce, so as to further improve the manufacturability of the camera lens assembly and reduce production cost.

In some embodiments, the camera lens assembly meets the following formula:

$$TAN(HFOV)/TTL \geq 0.28 \text{ mm}^{-1},$$

in which HFOV is half of a maximal field angle of the camera lens assembly.

In such a manner, the above formula is satisfied to enlarge a field angle of the camera lens assembly and also to effectively control the size of the camera lens assembly, thus obtaining a camera lens assembly with a large field angle and a small size.

In some embodiments, the camera lens assembly meets the following formula:

$$-1 < f4/f6 < -0.2,$$

in which f6 represents an effective focal length of the sixth lens L6.

The above formula is satisfied to ensure uniform shapes of the fourth lens L4 and the sixth lens L6, thus these lenses are easy to produce, so as to further improve the manufacturability of the camera lens assembly and reduce production cost.

In some embodiments, the camera lens assembly meets the following formula:

$$CT3/CT4 < 0.6,$$

in which CT3 is a thickness of the third lens L3 along the optical axis.

The above formula is satisfied to calibrate the aberration of the camera lens assembly, and to improve the imaging quality of the camera lens assembly.

In some embodiments, the camera lens assembly meets the following formula:

$$0.35 < f/f1 < 0.9,$$

in which f represents an effective focal length of the camera lens assembly, and f1 represents an effective focal length of the first lens L1.

The above formula is satisfied to decrease the angle of light, reduce tolerance sensitivity of the camera lens assembly, improve the imaging quality of the camera lens assembly and enlarge the field angle.

In some embodiments, the camera lens assembly meets the following formula:

$$0.45 < R1/R5 < 1.10,$$

in which R1 represents a curvature radius of the object side surface S1 of the first lens L1, and R5 represents a curvature radius of the object side surface S5 of the third lens L3.

The above formula is satisfied to adjust an incident angle of an incident image sensor in each field of view, so as to effectively avoid total reflection, and to reasonably shape the first lens L1 and the third lens L3 with smooth surfaces, thus these lenses are easy to produce and further reduce the production cost.

In some embodiments, the camera lens assembly meets the following formula:

$$TTL/ImgH < 1.6,$$

in which ImgH equals to half of a diagonal of an effective pixel region at an imaging side surface S15.

The above formula is satisfied to limit the volume of the camera lens assembly by controlling relationship between the total length of the camera lens assembly and the imaging region, thus facilitating the miniaturization of the camera lens assembly.

In some embodiments, the camera lens assembly meets the following formula:

$$(T12+T23)/TTL < 0.1,$$

in which T12 is a spacing distance between the first lens L1 and the second lens L2 along the optical axis, and T23 is a spacing distance between the second lens L2 and the third lens L3 along the optical axis.

The above formula is satisfied to well distribute the spacing distances among the first lens L1, the second lens L2 and the third lens L3, so as to facilitate assembling components and further to reduce cost.

In some embodiments, the first lens L1, the second lens L2, the third lens L3, the fourth lens L4, the fifth lens L5 and the sixth lens L6 each may be made of a plastic material and in a aspheric shape, thus reducing the cost, ensuring the imaging quality and reducing the size.

A surface shape of the aspheric shape is defined by a formula as below:

$$x = \frac{ch^2}{1 + \sqrt{1 - (k+1)c^2h^2}} + \sum Aih^i$$

in which h is a height from any point on the aspheric shape to an optical axis, c is an apex curvature, k is a conic coefficient, Ai is a coefficient for the i-th order of the aspheric.

EXAMPLE 1

In example 1, the camera lens assembly meets the conditions in the following tables:

TABLE 1

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0501 | | |
| S1 | aspheric | 1.8803 | 0.4130 | 1.544/56.11 | −0.7509 |
| S2 | aspheric | −1389.1510 | 0.1713 | | −19.4395 |
| S3 | aspheric | 10.0839 | 0.2300 | 1.640/23.53 | −93.2990 |
| S4 | aspheric | 2.7839 | 0.0485 | | −61.2185 |
| S5 | aspheric | 1.8720 | 0.2300 | 1.640/23.53 | −29.3455 |
| S6 | aspheric | 2.3358 | 0.1489 | | −44.3445 |
| S7 | aspheric | −2.8141 | 0.6630 | 1.544/56.11 | −47.0193 |
| S8 | aspheric | −0.5823 | 0.0329 | | −3.4174 |
| S9 | aspheric | −5.6031 | 0.2649 | 1.640/23.53 | 7.4387 |
| S10 | aspheric | 2000.0000 | 0.0300 | | −94.9977 |
| S11 | aspheric | 2.6276 | 0.2998 | 1.535/55.60 | 0.3298 |
| S12 | aspheric | 0.6293 | 0.3499 | | −4.5128 |
| S13 | spherical | infinity | 0.2100 | 1.517/64.17 | |
| S14 | spherical | infinity | 0.4500 | | |
| S15 | spherical | infinity | | | |

TABLE 2

| Surface No. | A4 | A6 | A8 | A10 | A12 | A14 | A16 |
|---|---|---|---|---|---|---|---|
| S1 | −1.2225E−01 | 4.7514E−01 | −5.1776E+00 | 2.5448E+01 | −8.2218E+01 | 1.4374E+02 | −1.0675E+02 |
| S2 | −2.5050E−01 | −6.6994E−01 | 9.6456E−02 | 4.8523E+00 | −1.9283E+01 | 3.3931E+01 | −2.2525E+01 |
| S3 | −2.7775E−01 | 6.4178E−01 | −9.6147E+00 | 3.8880E+01 | −9.2880E+01 | 1.3444E+02 | −8.3047E+01 |

TABLE 2-continued

| Surface No. | A4 | A6 | A8 | A10 | A12 | A14 | A16 |
|---|---|---|---|---|---|---|---|
| S4 | −3.1481E−02 | 4.5522E−01 | −3.6800E+00 | 9.3943E+00 | −1.2211E+01 | 8.4733E+00 | −2.8615E+00 |
| S5 | −2.1003E−01 | 7.8287E−02 | −1.7044E+00 | 6.7745E+00 | −9.5581E+00 | 5.3108E+00 | −8.2404E−01 |
| S6 | 1.3106E−01 | −1.0239E+00 | 2.1506E+00 | −3.0823E+00 | 3.7794E+00 | −3.2195E+00 | 1.2324E+00 |
| S7 | −1.0314E−01 | 5.9986E−01 | −9.1696E−01 | 1.0669E+00 | −1.0697E+00 | 6.9182E−01 | −2.0922E−01 |
| S8 | −6.0632E−01 | 1.5871E+00 | −3.3623E+00 | 4.9936E+00 | −3.9127E+00 | 1.4953E+00 | −2.2124E−01 |
| S9 | −1.0001E−01 | 3.7708E−01 | −3.9549E−01 | 1.8443E−02 | 1.5175E−01 | −7.3842E−02 | 1.0237E−02 |
| S10 | −1.5846E−01 | 5.6125E−01 | −7.5879E−01 | 4.9736E−01 | −1.7595E−01 | 3.3113E−02 | −2.6807E−03 |
| S11 | −2.6447E−01 | 2.1410E−01 | −2.0555E−01 | 1.3173E−01 | −4.5694E−02 | 8.0270E−03 | −5.6772E−04 |
| S12 | −1.7381E−01 | 1.2938E−01 | −9.0730E−02 | 4.2039E−02 | −1.1269E−02 | 1.5194E−03 | −7.4836E−05 |

TABLE 3

| f1 (mm) | 3.440 | f (mm) | 2.309 |
|---|---|---|---|
| f2 (mm) | −6.040 | Fno | 2 |
| f3 (mm) | 12.246 | TTL (mm) | 3.542 |
| f4 (mm) | 1.217 | | |
| f5 (mm) | −8.668 | | |
| f6 (mm) | −1.627 | | |

TABLE 6

| f1 (mm) | 4.095 | f (mm) | 2.309 |
|---|---|---|---|
| f2 (mm) | −8.074 | Fno | 2.02 |
| f3 (mm) | 10.757 | TTL (mm) | 3.575 |
| f4 (mm) | 1.244 | | |
| f5 (mm) | −7.612 | | |
| f6 (mm) | −1.753 | | |

EXAMPLE 2

In example 2, the camera lens assembly meets the conditions in the following tables:

TABLE 4

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0604 | | |
| S1 | aspheric | 1.7430 | 0.4100 | 1.544/56.11 | −0.2677 |
| S2 | aspheric | 7.2529 | 0.1881 | | −16.1339 |
| S3 | aspheric | 5.1390 | 0.2226 | 1.651/21.52 | −38.6829 |
| S4 | aspheric | 2.5643 | 0.0505 | | −68.9968 |
| S5 | aspheric | 1.7427 | 0.2194 | 1.651/21.52 | −35.5234 |
| S6 | aspheric | 2.1984 | 0.1443 | | −55.4486 |
| S7 | aspheric | −3.0176 | 0.6962 | 1.544/56.11 | −31.3913 |
| S8 | aspheric | −0.5997 | 0.0350 | | −3.3789 |
| S9 | aspheric | −6.3827 | 0.2828 | 1.651/21.52 | 7.2187 |
| S10 | aspheric | 23.4054 | 0.0300 | | −94.9303 |
| S11 | aspheric | 2.5060 | 0.3000 | 1.544/56.11 | 0.2420 |
| S12 | aspheric | 0.6632 | 0.3363 | | −4.5816 |
| S13 | spherical | infinity | 0.2100 | 1.517/64.17 | |
| S14 | spherical | infinity | 0.4500 | | |
| S15 | spherical | infinity | | | |

EXAMPLE 3

In example 3, the camera lens assembly meets the conditions in the following tables:

TABLE 7

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0656 | | |
| S1 | aspheric | 1.7598 | 0.4068 | 1.544/56.11 | −0.1597 |
| S2 | aspheric | 14.8084 | 0.1704 | | −80.4847 |
| S3 | aspheric | 7.7639 | 0.2300 | 1.651/21.52 | −94.3244 |
| S4 | aspheric | 2.9069 | 0.0505 | | −64.2697 |
| S5 | aspheric | 2.0842 | 0.2300 | 1.651/21.52 | −23.9861 |
| S6 | aspheric | 2.7852 | 0.1496 | | −42.4070 |
| S7 | aspheric | −2.6144 | 0.6680 | 1.544/56.11 | −36.5141 |
| S8 | aspheric | −0.5907 | 0.0350 | | −3.3956 |
| S9 | aspheric | −6.1006 | 0.2684 | 1.651/21.52 | 4.4414 |
| S10 | aspheric | 38.2332 | 0.0300 | | −95.0707 |
| S11 | aspheric | 2.5793 | 0.3000 | 1.544/56.11 | 0.2337 |
| S12 | aspheric | 0.6520 | 0.3383 | | −4.5797 |
| S13 | spherical | infinity | 0.2100 | 1.517/64.17 | |
| S14 | spherical | infinity | 0.4500 | | |
| S15 | spherical | infinity | | | |

TABLE 5

| Surface No. | A4 | A6 | A8 | A10 | A12 | A14 | A16 |
|---|---|---|---|---|---|---|---|
| S1 | −9.2569E−02 | 4.6713E−01 | −4.6384E+00 | 2.4674E+01 | −8.4535E+01 | 1.5085E+02 | −1.0764E+02 |
| S2 | −1.8616E−01 | −5.1987E−01 | −3.4667E+00 | 4.3305E+00 | −1.7413E+01 | 2.6898E+01 | −1.1820E+01 |
| S3 | −2.1999E−01 | 5.5378E−01 | −9.6149E+00 | 3.7146E+01 | −9.5308E+01 | 1.3287E+02 | −6.9665E+01 |
| S4 | −9.0416E−03 | 3.6439E−01 | −3.8038E+00 | 9.1205E+00 | −1.2656E+01 | 8.8053E+00 | −2.1958E+00 |
| S5 | −2.1334E−01 | 1.0768E−01 | −1.6981E+00 | 6.7203E+00 | −9.9377E+00 | 5.1428E+00 | −2.4486E−01 |
| S6 | 1.2348E−01 | −1.0283E+00 | 2.1665E+00 | −3.0385E+00 | 3.7895E+00 | −3.2793E+00 | 1.1977E+00 |
| S7 | −8.4184E−02 | 6.0845E−01 | −9.2197E−01 | 1.0610E+00 | −1.0701E+00 | 7.0839E−01 | −2.1038E−01 |
| S8 | −5.9927E−01 | 1.5814E+00 | −3.3816E+00 | 4.9944E+00 | −3.8949E+00 | 1.4949E+00 | −2.2351E−01 |
| S9 | −1.0072E−01 | 3.7866E−01 | −4.0317E−01 | 1.6986E−02 | 1.5270E−01 | −7.2904E−02 | 1.0132E−02 |
| S10 | −1.5457E−01 | 5.5990E−01 | −7.5927E−01 | 4.9709E−01 | −1.7595E−01 | 3.3146E−02 | −2.6666E−03 |
| S11 | −2.6364E−01 | 2.1516E−01 | −2.0614E−01 | 1.3154E−01 | −4.5686E−02 | 8.0526E−03 | −5.7115E−04 |
| S12 | −1.7414E−01 | 1.2747E−01 | −9.0304E−02 | 4.2176E−02 | −1.1267E−02 | 1.5112E−03 | −7.4915E−05 |

TABLE 8

| Surface No. | A4 | A6 | A8 | A10 | A12 | A14 | A16 |
|---|---|---|---|---|---|---|---|
| S1 | −1.0307E−01 | 4.4958E−01 | −4.8824E+00 | 2.5327E+01 | −8.3618E+01 | 1.4494E+02 | −1.0079E+02 |
| S2 | −1.8958E−01 | −5.8587E−01 | −1.1865E−01 | 4.4175E+00 | −1.6701E+01 | 2.7522E+01 | −1.4232E+01 |
| S3 | −2.1045E−01 | 6.9878E−01 | −9.6189E+00 | 3.7941E+01 | −9.2944E+01 | 1.3633E+02 | −8.2535E+01 |
| S4 | 4.5943E−03 | 4.3503E−01 | −3.6625E+00 | 9.3810E+00 | −1.2395E+01 | 8.6100E+00 | −2.8551E+00 |
| S5 | −2.1636E−01 | 9.2318E−02 | −1.6643E+00 | 6.8495E+00 | −9.7509E+00 | 5.1720E+00 | −6.7338E−01 |
| S6 | 1.3510E−01 | −1.0256E+00 | 2.1398E+00 | −3.0747E+00 | 3.7866E+00 | −3.2319E+00 | 1.2682E+00 |
| S7 | −9.6815E−02 | 6.0399E−01 | −9.2421E−01 | 1.0631E+00 | −1.0772E+00 | 6.9563E−01 | −1.8405E−01 |
| S8 | −5.9927E−01 | 1.5887E+00 | −3.3731E+00 | 4.9960E+00 | −3.8999E+00 | 1.4933E+00 | −2.2610E−01 |
| S9 | −9.5198E−02 | 3.7593E−01 | −3.9735E−01 | 1.8973E−02 | 1.5270E−01 | −7.3189E−02 | 9.7624E−03 |
| S10 | −1.5637E−01 | 5.6096E−01 | −7.5916E−01 | 4.9723E−01 | −1.7595E−01 | 3.3133E−02 | −2.6745E−03 |
| S11 | −2.6518E−01 | 2.1515E−01 | −2.0590E−01 | 1.3161E−01 | −4.5676E−02 | 8.0507E−03 | −5.7406E−04 |
| S12 | −1.7505E−01 | 1.2895E−01 | −9.0597E−02 | 4.2079E−02 | −1.1279E−02 | 1.5142E−03 | −7.3950E−05 |

TABLE 9

| f1(mm) | 3.618 | f(mm) | 2.318 |
|---|---|---|---|
| f2(mm) | −7.215 | Fno | 2 |
| f3(mm) | 11.165 | TTL(mm) | 3.537 |
| f4(mm) | 1.252 | | |
| f5(mm) | −7.996 | | |
| f6(mm) | −1.691 | | |

TABLE 12

| f1(mm) | 4.380 | f(mm) | 2.326 |
|---|---|---|---|
| f2(mm) | 100.016 | Fno | 1.99 |
| f3(mm) | 111.907 | TTL(mm) | 3.519 |
| f4(mm) | 1.296 | | |
| f5(mm) | −8.324 | | |
| f6(mm) | −1.766 | | |

EXAMPLE 4

In example 4, the camera lens assembly meets the conditions in the following tables:

TABLE 10

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0520 | | |
| S1 | aspheric | 1.7378 | 0.4303 | 1.544/56.11 | −0.1412 |
| S2 | aspheric | 5.8017 | 0.1837 | | −31.4253 |
| S3 | aspheric | 3.8903 | 0.2393 | 1.651/21.52 | −10.4140 |
| S4 | aspheric | 4.0345 | 0.0626 | | −80.8062 |
| S5 | aspheric | 2.8389 | 0.2100 | 1.651/21.52 | −45.1459 |
| S6 | aspheric | 2.8665 | 0.1315 | | −69.8271 |
| S7 | aspheric | −2.5221 | 0.6504 | 1.544/56.11 | −32.7706 |
| S8 | aspheric | −0.6028 | 0.0300 | | −3.5052 |
| S9 | aspheric | −7.0735 | 0.2924 | 1.651/21.52 | 4.6994 |
| S10 | aspheric | 24.4000 | 0.0300 | | −31.3208 |
| S11 | aspheric | 2.4903 | 0.2600 | 1.544/56.11 | 0.2208 |
| S12 | aspheric | 0.6694 | 0.3386 | | −4.4731 |
| S13 | spherical | infinity | 0.2100 | 1.517/64.17 | |
| S14 | spherical | infinity | 0.4500 | | |
| S15 | spherical | infinity | | | |

EXAMPLE 5

In example 5, the camera lens assembly meets the conditions in the following tables:

TABLE 13

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0501 | | |
| S1 | aspheric | 1.6910 | 0.4653 | 1.544/56.11 | 0.4013 |
| S2 | aspheric | 14.8012 | 0.2301 | | 50.0000 |
| S3 | aspheric | −10.0015 | 0.2000 | 1.651/21.52 | −99.9900 |
| S4 | aspheric | 11.0798 | 0.0300 | | −99.9990 |
| S5 | aspheric | 2.9183 | 0.2100 | 1.651/21.52 | −31.3652 |
| S6 | aspheric | 3.1879 | 0.1131 | | −99.8511 |
| S7 | aspheric | −2.7071 | 0.7106 | 1.544/56.11 | −32.7706 |
| S8 | aspheric | −0.6371 | 0.0300 | | −3.4169 |
| S9 | aspheric | 27.4243 | 0.2200 | 1.651/21.52 | 4.6994 |
| S10 | aspheric | 9.9344 | 0.0300 | | −31.3208 |
| S11 | aspheric | 2.3123 | 0.3142 | 1.544/56.11 | −0.2225 |
| S12 | aspheric | 0.6528 | 0.3868 | | −4.1438 |
| S13 | spherical | infinity | 0.2100 | 1.517/64.17 | |
| S14 | spherical | infinity | 0.4500 | | |
| S15 | spherical | infinity | | | |

TABLE 11

| Surface No. | A4 | A6 | A8 | A10 | A12 | A14 | A16 |
|---|---|---|---|---|---|---|---|
| S1 | −8.2089E−02 | 3.2259E−01 | −4.3636E+00 | 2.5078E+01 | −8.5391E+01 | 1.5163E+02 | −1.1116E+02 |
| S2 | −1.9289E−01 | −4.0134E−01 | −5.7240E−01 | 4.7916E+00 | −1.7583E+01 | 2.9321E+01 | −1.7675E+01 |
| S3 | −1.9722E−01 | 5.9094E−01 | −9.0636E+00 | 3.6436E+01 | −9.3704E+01 | 1.3081E+02 | −7.1625E+01 |
| S4 | −1.0649E−02 | 3.6464E−01 | −3.7338E+00 | 9.1020E+00 | −1.2796E+01 | 9.0553E+00 | −2.3414E+00 |
| S5 | 1.3154E−01 | −1.0265E+00 | 2.1640E+00 | −3.0307E+00 | 3.7873E+00 | −3.2693E+00 | 1.2109E+00 |
| S6 | −2.2984E−01 | 9.4427E−02 | −1.7299E+00 | 6.7708E+00 | −9.8585E+00 | 5.0928E+00 | −1.7988E−01 |
| S7 | −4.6911E−01 | 3.4862E−01 | −6.7239E−01 | 1.6606E+00 | −2.4930E+00 | 1.7474E+00 | −4.7152E−01 |
| S8 | −4.2604E−01 | 6.0909E−01 | −6.2061E−01 | 1.1804E−01 | 1.4740E+00 | −1.8333E+00 | 6.4260E−01 |
| S9 | 1.2147E−02 | −3.6188E−01 | 1.2465E+00 | −2.0959E+00 | 1.8366E+00 | −8.6044E−01 | 1.7029E−01 |
| S10 | −8.5344E−02 | 2.7298E−01 | −3.3625E−01 | 1.9219E−01 | −5.9916E−02 | 1.0565E−02 | −8.8078E−04 |
| S11 | −2.1244E−01 | 6.0139E−02 | −2.9979E−02 | 3.0677E−02 | −1.4589E−02 | 3.0860E−03 | −2.4659E−04 |
| S12 | −1.5883E−01 | 8.6925E−02 | −4.3139E−02 | 1.2234E−02 | −9.1397E−04 | −3.1562E−04 | 5.2820E−05 |

TABLE 14

| Surface No. | A4 | A6 | A8 | A10 | A12 | A14 | A16 |
|---|---|---|---|---|---|---|---|
| S1 | −6.1931E−02 | 2.9743E−01 | −4.1698E+00 | 2.4816E+01 | −8.5391E+01 | 1.5163E+02 | −1.1116E+02 |
| S2 | −1.5304E−01 | −3.4497E−01 | −5.6411E−01 | 4.3771E+00 | −1.7583E+01 | 2.9321E+01 | −1.7675E+01 |
| S3 | −2.0659E−01 | 4.3272E−01 | −9.0867E+00 | 3.6417E+01 | −9.3704E+01 | 1.3081E+02 | −7.1625E+01 |
| S4 | −5.6174E−02 | 3.9238E−01 | −3.7212E+00 | 9.0879E+00 | −1.2818E+01 | 9.0535E+00 | −2.3414E+00 |
| S5 | −2.4167E−01 | 8.5409E−02 | −1.7343E+00 | 6.7654E+00 | −9.8674E+00 | 5.0794E+00 | −1.8956E−01 |
| S6 | 1.1453E−01 | −1.0309E+00 | 2.1622E+00 | −3.0303E+00 | 3.7891E+00 | −3.2672E+00 | 1.2115E+00 |
| S7 | −2.3866E−02 | 2.5345E−01 | 4.0170E−01 | −2.0390E+00 | 2.8896E+00 | −1.9589E+00 | 5.4564E−01 |
| S8 | −5.6828E−01 | 1.4140E+00 | −2.9760E+00 | 4.7525E+00 | −4.3552E+00 | 2.0181E+00 | −3.6087E−01 |
| S9 | −3.3642E−01 | 1.0492E+00 | −1.3993E+00 | 8.4156E−01 | −2.0702E−01 | −2.1728E−02 | 1.5777E−02 |
| S10 | −1.9669E−02 | 3.5701E−01 | −6.6758E−01 | 5.0141E−01 | −1.9635E−01 | 4.0519E−02 | −3.5201E−03 |
| S11 | 1.2603E−01 | −5.9020E−01 | 5.2091E−01 | −2.2553E−01 | 5.3896E−02 | −6.8137E−03 | 3.5422E−04 |
| S12 | −5.7047E−02 | −8.3845E−02 | 8.1910E−02 | −3.1213E−02 | 5.3013E−03 | −2.6591E−04 | −1.3575E−05 |

TABLE 15

| f1(mm) | 3.454 | f(mm) | 2.316 |
|---|---|---|---|
| f2(mm) | −7.978 | Fno | 1.99 |
| f3(mm) | 40.167 | TTL(mm) | 3.600 |
| f4(mm) | 1.361 | | |
| f5(mm) | −23.851 | | |
| f6(mm) | −1.786 | | |

TABLE 18

| f1(mm) | 4.107 | f(mm) | 2.289 |
|---|---|---|---|
| f2(mm) | −10.074 | Fno | 1.99 |
| f3(mm) | 6.834 | TTL(mm) | 3.600 |
| f4(mm) | 1.610 | | |
| f5(mm) | −96.464 | | |
| f6(mm) | −1.872 | | |

EXAMPLE 6

In example 6, the camera lens assembly meets the conditions in the following tables:

TABLE 16

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0625 | | |
| S1 | aspheric | 1.7966 | 0.4771 | 1.544/56.11 | 0.5281 |
| S2 | aspheric | 8.1931 | 0.1675 | | −26.8813 |
| S3 | aspheric | 4.3163 | 0.2112 | 1.651/21.52 | −97.7043 |
| S4 | aspheric | 2.5609 | 0.0678 | | −46.2324 |
| S5 | aspheric | 3.8722 | 0.2369 | 1.544/56.11 | −78.4055 |
| S6 | aspheric | −100.1057 | 0.0926 | | 50.0000 |
| S7 | aspheric | −1.7488 | 0.7095 | 1.544/56.11 | −32.7706 |
| S8 | aspheric | −0.6687 | 0.0300 | | −3.6588 |
| S9 | aspheric | 7.2776 | 0.2200 | 1.651/21.52 | 4.6994 |
| S10 | aspheric | 6.4492 | 0.0402 | | −31.3208 |
| S11 | aspheric | 1.9181 | 0.3015 | 1.544/56.11 | −0.1225 |
| S12 | aspheric | 0.6296 | 0.3857 | | −4.0166 |
| S13 | spherical | infinity | 0.2100 | 1.517/64.17 | |
| S14 | spherical | infinity | 0.4500 | | |
| S15 | spherical | infinity | | | |

EXAMPLE 7

In example 7, the camera lens assembly meets the conditions in the following tables:

TABLE 19

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0295 | | |
| S1 | aspheric | 1.6703 | 0.3703 | 1.544/56.11 | 0.3621 |
| S2 | aspheric | 3.2549 | 0.1488 | | −40.6123 |
| S3 | aspheric | 2.0198 | 0.2524 | 1.651/21.52 | −10.1853 |
| S4 | aspheric | 1.7774 | 0.1113 | | −11.8915 |
| S5 | aspheric | 2.8767 | 0.2100 | 1.651/21.52 | −99.9900 |
| S6 | aspheric | 2.1646 | 0.0525 | | −68.3033 |
| S7 | aspheric | 10.0030 | 0.8352 | 1.544/56.11 | −32.7706 |
| S8 | aspheric | −0.7102 | 0.0300 | | −3.8763 |
| S9 | aspheric | 94.1571 | 0.2200 | 1.651/21.52 | 4.6994 |
| S10 | aspheric | 22.4501 | 0.0470 | | −31.3208 |
| S11 | aspheric | 2.2191 | 0.2600 | 1.544/56.11 | −0.1753 |
| S12 | aspheric | 0.6148 | 0.3541 | | −3.3143 |
| S13 | spherical | infinity | 0.2100 | 1.517/64.17 | |
| S14 | spherical | infinity | 0.4500 | | |
| S15 | spherical | infinity | | | |

TABLE 17

| Surface No. | A4 | A6 | A8 | A10 | A12 | A14 | A16 |
|---|---|---|---|---|---|---|---|
| S1 | −5.6887E−02 | 3.1879E−01 | −4.1867E+00 | 2.4978E+01 | −8.5391E+01 | 1.5163E+02 | −1.1116E+02 |
| S2 | −1.8535E−01 | −3.2296E−01 | −5.4336E−01 | 4.3648E+00 | −1.7583E+01 | 2.9321E+01 | −1.7675E+01 |
| S3 | −2.8292E−01 | 5.2831E−01 | −9.1309E+00 | 3.6172E+01 | −9.3704E+01 | 1.3081E+02 | −7.1625E+01 |
| S4 | −5.6982E−02 | 3.8056E−01 | −3.6736E+00 | 9.1675E+00 | −1.2770E+01 | 8.9850E+00 | −2.3414E+00 |
| S5 | −2.2596E−01 | 9.7144E−02 | −1.7456E+00 | 6.7375E+00 | −9.8892E+00 | 5.0880E+00 | −1.6318E−01 |
| S6 | 1.0893E−01 | −1.0321E+00 | 2.1595E+00 | −3.0349E+00 | 3.7797E+00 | −3.2841E+00 | 1.1875E+00 |
| S7 | −1.9155E−02 | 9.1486E−01 | −9.5149E−01 | 6.0056E−02 | 5.1250E−01 | −3.1221E−01 | 4.3386E−02 |
| S8 | −5.1578E−01 | 1.0138E+00 | −1.2907E+00 | 1.2289E+00 | −6.0216E−01 | 6.6414E−02 | 3.3753E−02 |
| S9 | −2.2490E−01 | 6.9273E−01 | −6.7805E−01 | −5.0107E−01 | 1.3122E+00 | −9.0368E−01 | 2.1418E−01 |
| S10 | 3.0649E−01 | −3.0243E−01 | −7.4580E−02 | 2.3502E−01 | −1.5096E−01 | 4.4512E−02 | −5.1035E−03 |
| S11 | 2.5190E−01 | −9.6859E−01 | 9.2748E−01 | −4.5448E−01 | 1.2468E−01 | −1.8267E−02 | 1.1128E−03 |
| S12 | −3.5388E−02 | −1.5198E−01 | 1.4469E−01 | −6.0491E−02 | 1.3285E−02 | −1.4783E−03 | 6.3172E−05 |

TABLE 20

| Surface No. | A4 | A6 | A8 | A10 | A12 | A14 | A16 |
|---|---|---|---|---|---|---|---|
| S1 | −6.7537E−02 | 3.5992E−01 | −4.3165E+00 | 2.5074E+01 | −8.5391E+01 | 1.5163E+02 | −1.1116E+02 |
| S2 | −1.4677E−01 | −3.0404E−01 | −7.3361E−01 | 4.6320E+00 | −1.7583E+01 | 2.9321E+01 | −1.7675E+01 |
| S3 | −3.4438E−01 | 5.9512E−01 | −8.7388E+00 | 3.5835E+01 | −9.3704E+01 | 1.3081E+02 | −7.1625E+01 |
| S4 | −1.1624E−01 | 3.6583E−01 | −3.6320E+00 | 9.1911E+00 | −1.2824E+01 | 8.7821E+00 | −2.3414E+00 |
| S5 | −2.4493E−01 | 1.1842E−01 | −1.7495E+00 | 6.6959E+00 | −9.9307E+00 | 5.0817E+00 | −9.3454E−02 |
| S6 | 5.1676E−02 | −1.0309E+00 | 2.1477E+00 | −3.0333E+00 | 3.7959E+00 | −3.2607E+00 | 1.2104E+00 |
| S7 | 7.0132E−02 | 1.2822E−02 | −2.0440E−01 | 1.0481E+00 | −1.8593E+00 | 1.4397E+00 | −4.3160E−01 |
| S8 | −5.3395E−01 | 1.2877E+00 | −2.0357E+00 | 2.5685E+00 | −1.8158E+00 | 6.0124E−01 | −7.6094E−02 |
| S9 | −5.1730E−01 | 1.3555E+00 | −1.5159E+00 | 1.4730E−01 | 1.0275E+00 | −8.6948E−01 | 2.2663E−01 |
| S10 | −6.7663E−02 | 4.2387E−01 | −7.9970E−01 | 6.7427E−01 | −3.0724E−01 | 7.4895E−02 | −7.6412E−03 |
| S11 | −6.1549E−02 | −5.7702E−01 | 7.7299E−01 | −4.6134E−01 | 1.4842E−01 | −2.5055E−02 | 1.7409E−03 |
| S12 | −2.6782E−01 | 1.8584E−01 | −1.0663E−01 | 4.8617E−02 | −1.5254E−02 | 2.7356E−03 | −2.0582E−04 |

TABLE 21

| f1(mm) | 5.805 | f(mm) | 2.298 |
|---|---|---|---|
| f2(mm) | −38.409 | Fno | 1.99 |
| f3(mm) | −15.086 | TTL(mm) | 3.552 |
| f4(mm) | 1.249 | | |
| f5(mm) | −44.966 | | |
| f6(mm) | −1.652 | | |

TABLE 24

| f1(mm) | 4.106 | f(mm) | 2.317 |
|---|---|---|---|
| f2(mm) | −16.246 | Fno | 1.99 |
| f3(mm) | 20.036 | TTL(mm) | 3.506 |
| f4(mm) | 1.307 | | |
| f5(mm) | −11.684 | | |
| f6(mm) | −1.733 | | |

EXAMPLE 8

In example 8, the camera lens assembly meets the conditions in the following tables:

TABLE 22

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0439 | | |
| S1 | aspheric | 1.7086 | 0.4351 | 1.544/56.11 | 0.0227 |
| S2 | aspheric | 6.5368 | 0.1744 | | −29.0474 |
| S3 | aspheric | 4.2978 | 0.2173 | 1.651/21.52 | −21.5019 |
| S4 | aspheric | 3.0018 | 0.0688 | | −90.5733 |
| S5 | aspheric | 2.0461 | 0.2100 | 1.651/21.52 | −41.2008 |
| S6 | aspheric | 2.3246 | 0.1340 | | −64.2910 |
| S7 | aspheric | −2.6964 | 0.6600 | 1.544/56.11 | −32.7706 |
| S8 | aspheric | −0.6130 | 0.0300 | | −3.4981 |
| S9 | aspheric | −7.1157 | 0.2729 | 1.651/21.52 | 4.6994 |
| S10 | aspheric | −100.1691 | 0.0300 | | −31.3208 |
| S11 | aspheric | 2.6246 | 0.2772 | 1.544/56.11 | 0.2709 |
| S12 | aspheric | 0.6695 | 0.3359 | | −4.4285 |
| S13 | spherical | infinity | 0.2100 | 1.517/64.17 | |
| S14 | spherical | infinity | 0.4500 | | |
| S15 | spherical | infinity | | | |

EXAMPLE 9

In example 9, the camera lens assembly meets the conditions in the following tables:

TABLE 25

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0377 | | |
| S1 | aspheric | 1.7077 | 0.4333 | 1.544/56.11 | 0.0623 |
| S2 | aspheric | 6.9673 | 0.1758 | | −30.2937 |
| S3 | aspheric | 4.5580 | 0.2150 | 1.651/21.52 | −25.3582 |
| S4 | aspheric | 3.0066 | 0.0687 | | −88.8634 |
| S5 | aspheric | 2.0821 | 0.2100 | 1.651/21.52 | −41.8008 |
| S6 | aspheric | 2.3826 | 0.1356 | | −64.6624 |
| S7 | aspheric | −2.5086 | 0.6582 | 1.544/56.11 | −32.7706 |
| S8 | aspheric | −0.6588 | 0.0300 | | −3.4353 |
| S9 | aspheric | 52.3830 | 0.2553 | 1.651/21.52 | 4.6994 |
| S10 | aspheric | 257.5529 | 0.0300 | | −31.3208 |
| S11 | aspheric | 2.5767 | 0.2795 | 1.544/56.11 | 0.2625 |
| S12 | aspheric | 0.6492 | 0.3447 | | −4.1120 |
| S13 | spherical | infinity | 0.2100 | 1.517/64.17 | |
| S14 | spherical | infinity | 0.4500 | | |
| S15 | spherical | infinity | | | |

TABLE 23

| Surface No. | A4 | A6 | A8 | A10 | A12 | A14 | A16 |
|---|---|---|---|---|---|---|---|
| S1 | −7.7360E−02 | 3.3048E−01 | −4.3483E+00 | 2.5028E+01 | −8.5391E+01 | 1.5163E+02 | −1.1116E+02 |
| S2 | −1.9010E−01 | −3.9209E−01 | −5.9222E−01 | 4.7471E+00 | −1.7583E+01 | 2.9321E+01 | −1.7675E+01 |
| S3 | −2.1089E−01 | 5.7993E−01 | −9.0583E+00 | 3.6442E+01 | −9.3704E+01 | 1.3081E+02 | −7.1625E+01 |
| S4 | −7.9953E−03 | 3.6529E−01 | −3.7328E+00 | 9.1047E+00 | −1.2797E+01 | 9.0387E+00 | −2.3414E+00 |
| S5 | −2.2978E−01 | 9.4240E−02 | −1.7316E+00 | 6.7675E+00 | −9.8612E+00 | 5.0947E+00 | −1.7988E−01 |
| S6 | 1.2979E−01 | −1.0270E+00 | 2.1646E+00 | −3.0289E+00 | 3.7894E+00 | −3.2678E+00 | 1.2111E+00 |
| S7 | −1.1903E−01 | 8.2042E−01 | −1.9068E+00 | 3.4582E+00 | −4.1009E+00 | 2.5995E+00 | −6.7763E−01 |
| S8 | −4.4759E−01 | 7.3821E−01 | −9.6961E−01 | 8.8842E−01 | 2.8132E−01 | −9.0392E−01 | 3.7129E−01 |
| S9 | −1.6191E−02 | −1.8251E−01 | 8.7554E−01 | −1.7292E+00 | 1.6704E+00 | −8.4550E−01 | 1.7710E−01 |
| S10 | −2.1930E−02 | 1.6894E−01 | −2.6259E−01 | 1.7733E−01 | −6.9830E−02 | 1.6341E−02 | −1.7269E−03 |
| S11 | −1.4939E−01 | −8.6810E−02 | 1.1658E−01 | −4.6591E−02 | 8.2482E−03 | −5.0691E−04 | −1.1509E−05 |
| S12 | −1.5200E−01 | 6.3084E−02 | −1.6848E−02 | −3.1323E−03 | 3.7806E−03 | −9.9051E−04 | 8.6260E−05 |

TABLE 26

| Surface No. | A4 | A6 | A8 | A10 | A12 | A14 | A16 |
|---|---|---|---|---|---|---|---|
| S1 | −7.5948E−02 | 3.2801E−01 | −4.3372E+00 | 2.4987E+01 | −8.5391E+01 | 1.5163E+02 | −1.1116E+02 |
| S2 | −1.8927E−01 | −3.8617E−01 | −6.0593E−01 | 4.7202E+00 | −1.7583E+01 | 2.9321E+01 | −1.7675E+01 |
| S3 | −2.1509E−01 | 5.7498E−01 | −9.0597E+00 | 3.6437E+01 | −9.3704E+01 | 1.3081E+02 | −7.1625E+01 |
| S4 | −8.6442E−03 | 3.6477E−01 | −3.7311E+00 | 9.1068E+00 | −1.2800E+01 | 9.0256E+00 | −2.3414E+00 |
| S5 | −2.3166E−01 | 9.3147E−02 | −1.7334E+00 | 6.7651E+00 | −9.8620E+00 | 5.0974E+00 | −1.7988E−01 |
| S6 | 1.3016E−01 | −1.0269E+00 | 2.1649E+00 | −3.0282E+00 | 3.7903E+00 | −3.2673E+00 | 1.2105E+00 |
| S7 | −9.0574E−02 | 6.4855E−01 | −1.2925E+00 | 2.1209E+00 | −2.4154E+00 | 1.4666E+00 | −3.6309E−01 |
| S8 | −4.3348E−01 | 6.0813E−01 | −4.7399E−01 | −1.0991E−01 | 1.3202E+00 | −1.4356E+00 | 4.7579E−01 |
| S9 | −1.8486E−01 | 2.7336E−01 | 1.2196E−02 | −6.9820E−01 | 9.0119E−01 | −5.1192E−01 | 1.1315E−01 |
| S10 | 6.9774E−02 | 3.0641E−02 | −1.8318E−01 | 1.6310E−01 | −7.5433E−02 | 1.9356E−02 | −2.1243E−03 |
| S11 | −8.4893E−02 | −2.0902E−01 | 2.3206E−01 | −1.0772E−01 | 2.6581E−02 | −3.4280E−03 | 1.8119E−04 |
| S12 | −1.8269E−01 | 1.0966E−01 | −6.0592E−02 | 2.2482E−02 | −4.7030E−03 | 4.6872E−04 | −1.5193E−05 |

TABLE 27

| f1(mm) | 4.027 | f(mm) | 2.303 |
|---|---|---|---|
| f2(mm) | −14.239 | Fno | 1.99 |
| f3(mm) | 19.693 | TTL(mm) | 3.496 |
| f4(mm) | 1.454 | | |
| f5(mm) | 100.133 | | |
| f6(mm) | −1.676 | | |

EXAMPLE 10

In example 10, the camera lens assembly meets the conditions in the following tables:

TABLE 28

| Surface No. | Surface type | Curvature radius | Thickness | Material | Conic coefficient |
|---|---|---|---|---|---|
| OBJ | spherical | infinity | 500.0000 | | |
| STO | spherical | infinity | −0.0425 | | |
| S1 | aspheric | 1.7300 | 0.4120 | 1.544/56.11 | 0.2352 |
| S2 | aspheric | 9.6383 | 0.2127 | | −14.8945 |
| S3 | aspheric | 7.0222 | 0.2000 | 1.640/23.53 | −80.0394 |
| S4 | aspheric | 2.4662 | 0.0394 | | −63.3031 |
| S5 | aspheric | 1.8816 | 0.2100 | 1.640/23.53 | −35.4281 |
| S6 | aspheric | 2.1903 | 0.1181 | | −49.4383 |
| S7 | aspheric | −3.5262 | 0.7528 | 1.544/56.11 | −32.7706 |
| S8 | aspheric | −0.6784 | 0.0300 | | −3.1803 |
| S9 | aspheric | 11.8910 | 0.2200 | 1.544/56.11 | 4.6994 |
| S10 | aspheric | 14.9922 | 0.0300 | | −31.3208 |
| S11 | aspheric | 2.2807 | 0.3090 | 1.544/56.11 | 0.0480 |
| S12 | aspheric | 0.6559 | 0.3812 | | −3.7270 |
| S13 | spherical | infinity | 0.2100 | 1.517/64.17 | |
| S14 | spherical | infinity | 0.4500 | | |
| S15 | spherical | infinity | | | |

TABLE 29

| Surface No. | A4 | A6 | A8 | A10 | A12 | A14 | A16 |
|---|---|---|---|---|---|---|---|
| S1 | −6.6704E−02 | 2.8356E−01 | −4.1883E+00 | 2.4737E+01 | −8.5391E+01 | 1.5163E+02 | −1.1116E+02 |
| S2 | −1.8100E−01 | −3.2171E−01 | −5.9583E−01 | 4.4956E+00 | −1.7583E+01 | 2.9321E+01 | −1.7675E+01 |
| S3 | −2.3883E−01 | 5.5741E−01 | −9.0199E+00 | 3.6456E+01 | −9.3704E+01 | 1.3081E+02 | −7.1625E+01 |
| S4 | 2.3296E−04 | 3.4295E−01 | −3.7457E+00 | 9.1182E+00 | −1.2777E+01 | 9.0293E+00 | −2.3414E+00 |
| S5 | −2.4432E−01 | 8.7490E−02 | −1.7432E+00 | 6.7493E+00 | −9.8676E+00 | 5.1276E+00 | −1.6983E−01 |
| S6 | 1.4641E−01 | −1.0251E+00 | 2.1639E+00 | −3.0261E+00 | 3.7951E+00 | −3.2672E+00 | 1.1980E+00 |
| S7 | 4.9316E−02 | 3.2275E−01 | −3.0522E−01 | −5.5784E−01 | 1.4446E+00 | −1.2370E+00 | 3.8467E−01 |
| S8 | −4.2782E−01 | 8.0628E−01 | −1.2823E+00 | 1.4097E+00 | −6.1087E−01 | −4.1703E−02 | 7.2266E−02 |
| S9 | −3.6943E−01 | 1.1338E+00 | −1.6602E+00 | 1.3417E+00 | −6.7497E−01 | 1.9713E−01 | −2.4518E−02 |
| S10 | −4.2185E−02 | 3.8418E−01 | −5.8952E−01 | 3.9765E−01 | −1.3934E−01 | 2.4819E−02 | −1.7649E−03 |
| S11 | −2.9400E−02 | −3.5078E−01 | 3.8542E−01 | −1.9022E−01 | 5.0107E−02 | −6.8435E−03 | 3.7931E−04 |
| S12 | −1.4119E−01 | 4.1057E−02 | −9.2760E−03 | 4.8830E−03 | −2.5333E−03 | 6.2110E−04 | −5.5188E−05 |

TABLE 30

| f1(mm) | 3.792 | f(mm) | 2.291 |
|---|---|---|---|
| f2(mm) | −5.894 | Fno | 1.99 |
| f3(mm) | 16.018 | TTL(mm) | 3.575 |
| f4(mm) | 1.407 | | |
| f5(mm) | 102.725 | | |
| f6(mm) | −1.808 | | |

In examples 1 to 10, formulas meet the conditions in the following tables:

TABLE 31

| Formula | Example | | | | | | | | | |
|---|---|---|---|---|---|---|---|---|---|---|
| | 1 | 2 | 3 | 4 | 5 | 6 | 7 | 8 | 9 | 10 |
| f4/CT4 < 2.5 | 1.836 | 1.787 | 1.874 | 1.992 | 1.916 | 2.269 | 1.495 | 1.980 | 2.209 | 1.869 |
| 0.15 < CT4/TTL < 0.3 | 0.187 | 0.195 | 0.189 | 0.185 | 0.197 | 0.197 | 0.235 | 0.188 | 0.188 | 0.211 |
| TAN(HFOV)/TTL ≥ 0.28 (mm$^{-1}$) | 0.282 | 0.280 | 0.283 | 0.304 | 0.298 | 0.297 | 0.297 | 0.304 | 0.305 | 0.293 |
| −1 < f4/f6 < −0.2 | −0.748 | −0.710 | −0.740 | −0.734 | −0.762 | −0.860 | −0.756 | −0.754 | −0.868 | −0.778 |
| CT3/CT4 < 0.6 | 0.347 | 0.315 | 0.344 | 0.323 | 0.296 | 0.334 | 0.251 | 0.318 | 0.319 | 0.279 |
| 0.35 < f/f1 < 0.9 | 0.671 | 0.564 | 0.641 | 0.531 | 0.670 | 0.557 | 0.396 | 0.564 | 0.572 | 0.604 |
| 0.45 < R1/R5 < 1.10 | 1.004 | 1.000 | 0.844 | 0.612 | 0.579 | 0.464 | 0.581 | 0.835 | 0.820 | 0.919 |
| TTL/ImgH < 1.6 | 1.550 | 1.565 | 1.548 | 1.466 | 1.500 | 1.500 | 1.480 | 1.461 | 1.457 | 1.490 |
| (T12 + T23)/TTL < 0.1 | 0.062 | 0.067 | 0.062 | 0.070 | 0.072 | 0.065 | 0.073 | 0.069 | 0.070 | 0.071 |

Figure 51:
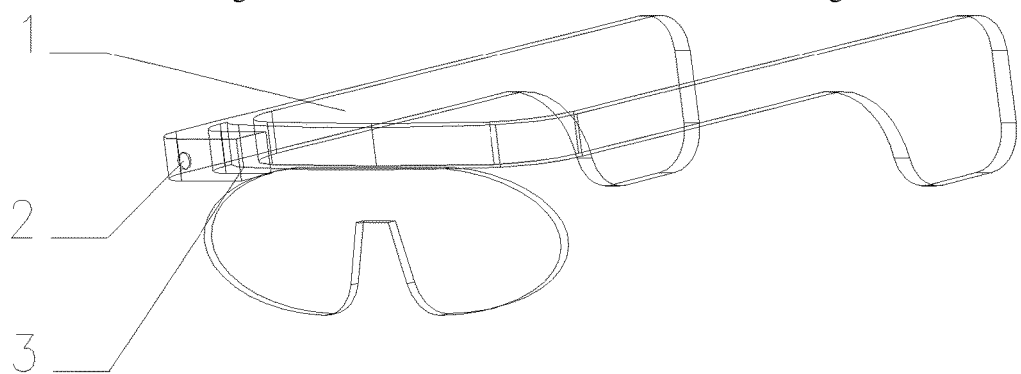
FIG. 51 is a schematic view showing a portable electronic device according to an embodiment of the present disclosure.

In FIG. 51, due to the advantages of higher imaging quality and smaller size, the camera lens assembly according to embodiments of the present disclosure thus may be applied to a portable electronic device.

The portable electronic device may include a controlling device 1, a imaging device 2 and a projecting device 3. The controlling device 1 is configured to control the portable electronic device, e.g., to control the imaging device 2 to form an image and to control the projecting device 3 to project, it may also be configured to control cooperation between the imaging device 2 and the projecting device 3, for example, to control the projecting device 3 to project the image at the same time the image is formed by the imaging device 2.

The imaging device 2 includes the camera lens assembly according to embodiments of the present disclosure and an image sensor. The camera lens assembly is configured to form an optical image and the image sensor is configured to convert the optical image formed by the camera lens assembly into an electronic image.

The projecting device 3 includes a spatial light modulator (SLM) and a projecting lens system. The SLM is configured to modulate the electronic image to an optical image and the projecting lens system is configured to project the optical image so as to enlarge the image.

In embodiments of the present disclosure, the portable electronic device may be a wearable device, such as a pair of multimedia glasses. In an embodiment, the controlling device 1 is arranged on the bracket, the imaging device 2 is arranged on the frame facing forward, and configured to take a scene in front of a user, and the projecting device 3 is also arranged on the frame facing backward, so as to project images on eyes of the user.

Reference throughout this specification to "an embodiment", "some embodiments", "one embodiment", "another example", "an example", "a specific example", or "some examples", means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example", "in an example", "in a specific example", or "in some examples", in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. A camera lens assembly, comprising:
a first lens, a second lens, a third lens, a fourth lens, a fifth lens and a sixth lens from an object side of the camera lens assembly to an image side of the camera lens assembly in turn, wherein:
the first lens is of a positive focal power, an object side surface of the first lens is convex;
the second lens is of a focal power, an image side surface of the second lens is a symmetrically-transitional surface from concave to convex along a direction vertical to an optical axis, wherein the image side surface of the second lens is concave close to the optical axis and convex away from the optical axis;
the third lens is of a focal power, an object side surface of the third lens is convex;
the fourth lens is of a positive focal power, an image side surface of the fourth lens is convex;
the fifth lens is of a focal power, and
the sixth lens is of a negative focal power, an object side surface of the sixth lens is convex and an image side surface of the sixth lens is concave;
the camera lens assembly meets the following formula:

$f4/CT4<2.5$, wherein f4 represents an effective focal length of the fourth lens, and
CT4 is a thickness of the fourth lens along the optical axis.

2. The camera lens assembly according to claim 1, wherein the camera lens assembly meets the following formula:

$0.15<CT4/TTL<0.3$, wherein CT4 is a thickness of the fourth lens along the optical axis, and
TTL is a total length of the camera lens assembly.

3. The camera lens assembly according to claim 1, wherein the camera lens assembly meets the following formula:

$TAN(HFOV)/TTL\geq0.28 \text{mm}^{-1}$, wherein HFOV is half of a maximal field angle of the camera lens assembly, and
TTL is a total length of the camera lens assembly.

4. The camera lens assembly according to claim 1, wherein the camera lens assembly meets the following formula:

$-1<f4/f6<-0.2$, wherein f6 represents an effective focal length of the sixth lens.

5. The camera lens assembly according to claim 1, wherein the camera lens assembly meets the following formula:

$$CT3/CT4<0.6,$$

wherein CT3 is a thickness of the third lens along the optical axis, and
CT4 is a thickness of the fourth lens along the optical axis.

6. The camera lens assembly according to claim 1, wherein the camera lens assembly meets the following formula:

$$0.35<f/f1<0.9,$$

wherein f represents an effective focal length of the camera lens assembly, and
f1 represents an effective focal length of the first lens.

7. The camera lens assembly according to claim 1, wherein the camera lens assembly meets the following formula:

$$0.45<R1/R5<1.10,$$

wherein R1 represents a curvature radius of the object side surface of the first lens, and
R5 represents a curvature radius of the object side surface of the third lens.

8. The camera lens assembly according to claim 1, wherein the camera lens assembly meets the following formula:

$$TTL/ImgH<1.6,$$

wherein TTL is a total length of the camera lens assembly, and
ImgH equals to half of a diagonal of an effective pixel region at an imaging side surface of the camera lens assembly.

9. The camera lens assembly according to claim 1, wherein the camera lens assembly meets the following formula:

$$(T12+T23)/TTL<0.1,$$

wherein T12 is a spacing distance between the first lens and the second lens along the optical axis,
T23 is a spacing distance between the second lens and the third lens along the optical axis, and
TTL is a total length of the camera lens assembly.

10. A portable electronic device, comprising:
an imaging device comprising a camera lens assembly configured to form an image, the camera lens assembly comprising:
a first lens, a second lens, a third lens, a fourth lens, a fifth lens and a sixth lens from an object side of the camera lens assembly to an image side of the camera lens assembly in turn, wherein:
the first lens is of a positive focal power, an object side surface of the first lens is convex;
the second lens is of a focal power, an image side surface of the second lens is a symmetrically-transitional surface from concave to convex along a direction vertical to an optical axis, wherein the image side surface of the second lens is concave close to the optical axis and convex away from the optical axis;
the third lens is of a focal power, an object side surface of the third lens is convex;
the fourth lens is of a positive focal power, an image side surface of the fourth lens is convex;
the fifth lens is of a focal power, and
the sixth lens is of a negative focal power, an object side surface of the sixth lens is convex and an image side surface of the sixth lens is concave;
the camera lens assembly meets the following formula:

$$f4/CT4<2.5,$$

wherein f4 represents an effective focal length of the fourth lens, and
CT4 is a thickness of the fourth lens along the optical axis,
a projecting device configured to project, and
a controlling device configured to control the imaging device and the projecting device.

11. The portable electronic device according to claim 10, further comprising a pair of multimedia glasses comprising a bracket and a frame, wherein
the controlling device is arranged on the bracket,
the imaging device is arranged on the frame facing forward, and configured to take a scene in front of a user, and
the projecting device is arranged on the frame facing backward, and configured to project the image on eyes of the user.

* * * * *